United States Patent [19]

Cooper

[11] E Patent Number: Re. 33,535

[45] Reissued Date of Patent: Feb. 12, 1991

[54] AUDIO TO VIDEO TIMING EQUALIZER METHOD AND APPARATUS

[76] Inventor: J. Carl Cooper, 1373 Sydney Dr., Sunnyvale, Calif. 94087

[21] Appl. No.: 426,022

[22] Filed: Oct. 23, 1989

Related U.S. Patent Documents

Reissue of:

[64] Patent No.: 4,703,355
Issued: Oct. 27, 1987
Appl. No.: 776,592
Filed: Sep. 16, 1985

[51] Int. Cl.[5] ..... H04N 5/04

[52] U.S. Cl. ..... 358/149; 358/198; 358/337; 360/36.1

[58] Field of Search ..... 358/143, 144, 145, 148, 358/149, 198, 337, 339, 320; 360/36.1, 36.2; 379/53

[56] References Cited

U.S. PATENT DOCUMENTS

| | | | |
|---|---|---|---|
| 4,218,705 | 8/1980 | Inaba et al. | 358/149 |
| 4,313,135 | 1/1982 | Cooper | 358/149 |
| 4,333,108 | 6/1982 | Quan et al. | 358/145 |
| 4,360,827 | 11/1982 | Braun | 358/149 |
| 4,361,852 | 11/1982 | Katzfey | 358/145 |
| 4,757,521 | 7/1988 | Korsky et al. | 358/149 |
| 4,851,909 | 7/1989 | Noske et al. | 358/149 |

*Primary Examiner*—James J. Groody
*Assistant Examiner*—Michael D. Parker
*Attorney, Agent, or Firm*—Woodling, Krost & Rust

[57] ABSTRACT

A method and apparatus for transmitting and resynchronizing audio and video signals characterized by the encoding of audio timing signals on the video signal prior to transmission, and the decoding of the audio timing signals from the video signal after transmission. The decoded audio timing signals are compared to timing signals generated from the transmitted audio signal, and a delay factor is generated to represent the relative delay between the transmitted audio signal and the transmitted video signal. Either the transmitted video signal or the transmitted audio signal is then delayed by the amount of the delay factor to resynchronize the two signals.

48 Claims, 11 Drawing Sheets

PRIOR ART

AUDIO SYNCHRONIZER SYSTEM

AUDIO IN VIDEO TRANSMISSION SYSTEM

BINARY AUDIO DECODER

DIGITAL AUDIO DELAY

VARIABLE FREQUENCY CLOCK DELAY DETECTOR

DIGITAL DELAY TO VARIABLE FREQUENCY CLOCK

AUDIO TO VIDEO TIMING EQUALIZER METHOD AND APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method and apparatus for measuring, preserving or restoring audio to video synchronization, or lip-sync, in television systems which use video processing devices such as frame synchronizers that generate large time delays in a processed video signal.

2. Description of the Prior Art

With the advance of television technology, and in particular the development of complex systems for processing video portions of television signals, time delays of video signals which are passed through these processing systems are increased to a point where a noticeable delay in the video signals, with respect to their associated audio signals, can be generated. One typical situation where this problem may arise is in the transmission of network programming over satellites.

In the past, the network programming in some parts of the U.S. was relayed by microwave links from one station to the next in serial fashion. This system worked but was costly and not always reliable. With the advent of satellites, the programming is now relayed via satellite directly to the television station. This system works better than that of the microwave links, but creates new system problems.

Due to the use of the satellites, the video signal which is received by the station contains what is known as time-base error due to the slow figure-eight drifting pattern of the satellite. This time-base error is a change of the phase of the television signal, with respect to a stable reference, due to the slowly changing transmission path length caused by the drifting satellite. In order to accommodate this time-base error introduced by the satellites transmission, stations use video frame synchronizers to receive the satellite video. The frame synchronizers removes the time-base error from the video, but in the process will cause a varying delay to be added to the video. The delay given to the video signal by the frame synchronizer may change continuously in order to make up for the changing path length of the satellite. In addition, the frame synchronizer may also change the video delay in response to slight frequency differences between the video reference of the transmitting station and the receiving station.

The audio portion of the program is not passed through the frame synchronizer and, therefore, is undelayed with respect to the delayed video leading to a lip-sync error. In addition, the audio may be transmitted over land lines rather than via the satellite thus aggrevating the audio to video timing error due to the addition of the changing satellite delay. Further errors may be accumulated by transmitting the video from the television studio to transmitter site via one path while the audio is fed to the transmitter via another.

Normally, in electronic systems, changes of delay times in associated signals can be compensated for by inserting fixed or manually adjustable delay devices in one of the signal paths. In this instance, the delay device is generally needed in the audio signal path. There are several commercially available devices for delaying audio signals by fixed or manually adjustable amounts; however, in this particular application, because the delay is constantly changing, manually adjustable or fixed delays are unsuitable. Devices known as audio synchronizers which can measure the video delay through a particular video processing device, are also used to correct audio-to-video timing problems. An audio synchronizer system is shown in FIG. 1. Once such device is described in U.S. Pat. No. 4,313,135. These devices operate by measuring the video delay through video devices by means of monitoring both the video input and the video output from the device. An audio delay is then caused to automatically match the video delay, thereby insuring that audio-to-video timing is preserved.

Audio synchronizer devices work well; however, the major drawback is that a connection is needed to both the video input and the video output from a particular video delay. Audio synchronizer devices also cannot account for a changing audio delay since they measure only the delay of the video signal. In the instance where the video input and the video output are removed physically, such as in a satellite or microwave links, it can be very difficult to implement an audio synchronizer in the television system. It would be possible to partially eliminate the problem by encoding a number in the vertical interval of the video signal which represents the amount of delay which the video signal is expected to acquire during transmission; however, this method requires an estimate or apriori knowledge of the delay which is not possible where the delay is constantly changing. This method would also require stripping off the old number and inserting a new number every time the video passes through a new delay.

SUMMARY OF THE INVENTION

It is an object of this invention to provide a method whereby the audio and video portions of a television program which arrive at a receiving location at different times may be equalized in timing.

It is a further object of this invention to provide a method of measuring the relative delay of the later arriving portion with respect to the earlier arriving portion of a television program having an audio and a video portion arriving at a receiving location.

It is another object of this invention to provide a method of encoding timing information derived from an audio signal into a video signal which will allow the relative timing of the two signals to be determined after one or both have been delayed.

It is still a further object of this invention to provide a method of determining the relative timing between a video signal containing timing information derived from an audio signal and that audio signal after one or both signals have been delayed.

Yet another object of this invention is to provide a method of controlling the playback speed of a recording device in order that the playback signal is properly timed to the playback of another recording device.

Briefly, the preferred embodiment of the audio to video timing equalizer apparatus of the present invention and method includes a timing encoder having a timing signal generator located before the video transmission path which causes the video delay and a delay decoder and delay generator located after the video transmission path. The timing encoder contains a timing signal generator responsive to audio of the television program to generate audio timing signals and a combiner circuit which combines the audio timing signals from the timing signal generator and the video part of the television program. The video and the audio timing signals are transmitted together through a transmission path or video processing device having a delay. The audio portion of the television programs may be transmitted through an audio transmission path or devide which does not need to be related to the video path.

At the output of the video transmission path, a timing signal recovery circuit, which is part of the delay decoder, is responsive to the video and the timing signal information, and operates to recover the timing signal information. A second timing signal generator, which is also part of the delay decoder, generates audio timing signals in response to the audio which has been passed through the audio transmission path.

A delay detector in the delay decoder is responsive to timing signals from the second timing signal generator and to the recovered timing signals obtained from the video signal transmission path which are output from the timing signal recovery circuit. The delay detector operates to determine the relative delay between the two timing signals which correspond to the timing error between audio and video.

The delay decoder outputs a delay signal which is responsive to the delay between the input audio and video signals. This delay signal may be used to control the delay of a variable audio or video delay of the delay generator or audio or video playback device in order that the earlier of video or audio from the transmission paths may be delayed by the amount of time necessary to cause it to correspond to the later signal from the video transmission paths. In this fashion, the delay decoder may operate without any direct connection to video which is input to the video transmission path, thereby providing a delay signal which is representative of the relative delay between audio and video at the output of the transmission paths, rather than having an output which is the absolute delay of the video through the video transmission path. It will be obvious from the teachings herein that this system may also be utilized for other types of associated signal, however, this disclosure will be made with respect to television audio and video signals by way of example.

A major advantage of the invention described herein is that the relative timing or delay between a television video signal and a related audio signal which arrive at a receiving location can be determined utilizing only those two signals. No connection to the audio or video signal before it is delayed is required at the delay decoding location.

A further advantage is that it is not required to determine the delay of either signal which occurs in the transmission to the receiving location since the relative delay between the two signals may be determined.

It is a further advantage of the invention that the earlier arriving signal may be delayed automatically in response to the aforementioned determined relative delay in order that it may coincide with the later arriving signal.

These and other objects and advantages of the present invention will become apparent to those skilled in the art upon reading the following descriptions and a study of the various figures of the drawing.

DETAILED DESCRIPTION OF THE PREFERRED EMBODIMENTS

Figure 1:
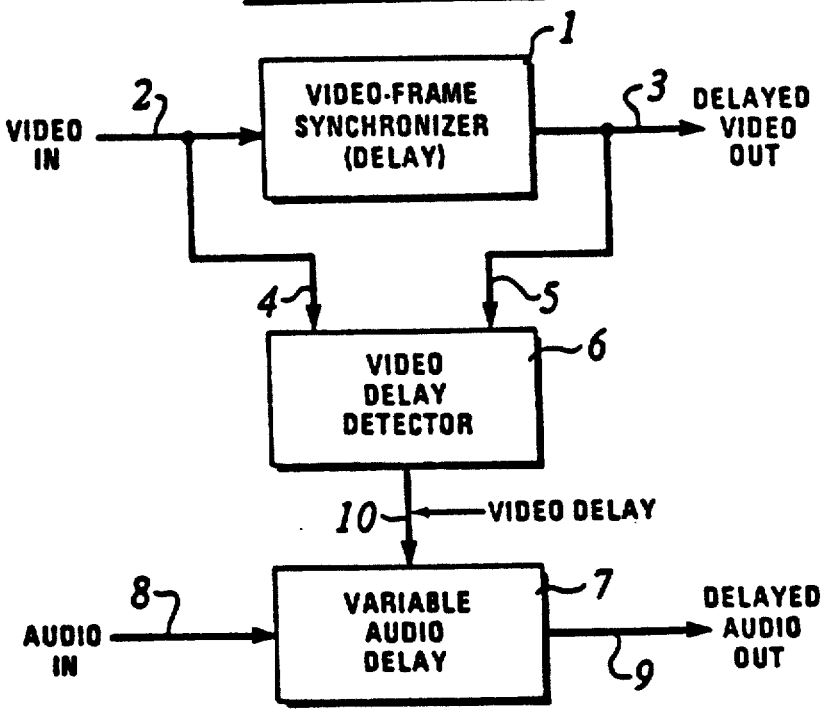
Figure 1 PRIOR ART
FIG. 1 is a block diagram of a typical, prior art audio synchronizer system.

FIG. 1 is the block diagram of a prior art audio synchronizer system containing a video frame synchronizer 1 having a video input terminal 2, a delayed video output terminal 3, a video delay detector 6 having a video input terminal 4, a delayed video input terminal 5 and providing a video delay signal 10. Also shown is a variable audio delay 7 having an audio input terminal 8 and a delayed audio output terminal 9, the variable audio delay being responsive to the video delay signal 10.

FIG. 1 shows by way of example a typical block diagram of a prior art audio synchronizer system which would be used to correct audio to video delay problems. In this system, a television video signal is passed through video frame synchronizer 1 which delays the video. Video delay detector 6 is responsive to video input to the frame synchronizer at terminal 4 and video output from the frame synchronizer at terminal 5, to measure the time difference, or time delay, of video from terminal 2 which is passed through the video frame synchronizer 1 to terminal 3. This delay is output from the delay detector 6 at terminal 10 and is applied to the variable audio delay 7. Audio delay 7 operates to delay the television program audio input on terminal 8 by an amount equal to the delay of the video passing through the video frame synchronizer and output the delayed audio on terminal 9.

The prior art audio synchronizer system of FIG. 1 works well; however, it requires that video which is input to the video frame synchronizer, or delay, and video output from the video frame synchronizer or delay are both applied to the video delay detector. This is an unsuitable situation where the input and output of the delay mechanism are removed by any physical distance. Such a situation happens if video is transmitted via satellite and audio is transmitted via another path such as terrestrial microwave.

Figure 2:
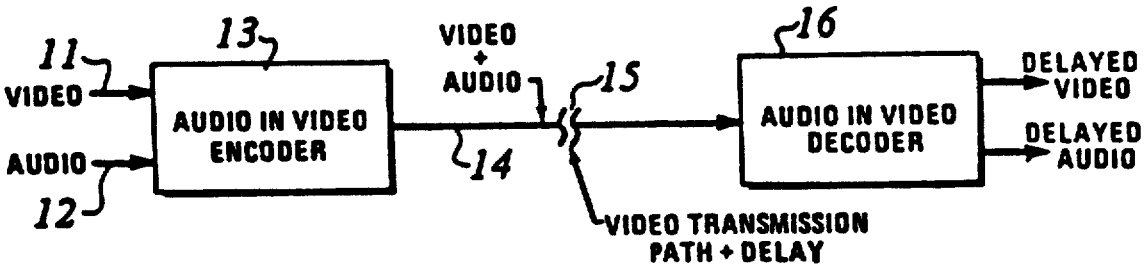
FIG. 2 is a block diagram of a typical, prior art audio in video transmission system.

FIG. 2 is a prior art audio in video transmission system having an audio in video encoder 13 which has a video input terminal 11 and an audio input terminal 12 and a video plus audio output terminal 14. Also shown is a video transmission path and delay 15, an audio in video decoder circuit 16 having an input terminal to receive audio from 15, a delayed video output terminal, and a delayed audio output terminal.

This prior art solution to ensure that audio and video synchronization is always maintained is to encode the audio portion of a television program onto the video part of the program. In FIG. 2, audio at input terminal 12 and video at input terminal 11 are applied to an audio in video encoder 13 where the audio is stored for 1 frame, time compressed and placed into the blanking interval of the video signal. The combined audio and video signal output from terminal 14 is then passed through the video transmission path, or other delay, 15 and is input to an audio in video decoder 16. The audio in video decoder then removes the digitized audio from the blanking interval of the video and reconverts it to analog audio where it is output in delayed form, delayed by the same amount as the video plus 1 frame. The video signal is also output in delayed form, the delay being due to 15. Since the audio and the video have both travelled the same path, then the delay of audio at the output terminal and the delay of video at the output terminal will be nominally the same; therefore, no large mis-synchronization of audio and video will occur.

The prior art system of FIG. 2 works well; however with current systems, it has a shortcoming in that when high quality audio is placed into the video blanking interval the video is no longer in conformance with NTSC standards, causing a great deal of difficulty if the video signal is to be processed by standard video equipment such as video tape recorders. Another problem with the system of FIG. 2, is that there is a limited amount of information-carrying capability in the video signal due to its limited blanking interval. Therefore, the quality or number of audio channels which can be handled by this system is limited. Two U.S. Patents describing such audio in video systems are U.S. Pat. Nos. 4,333,108 and 4,361,852.

Figure 3:
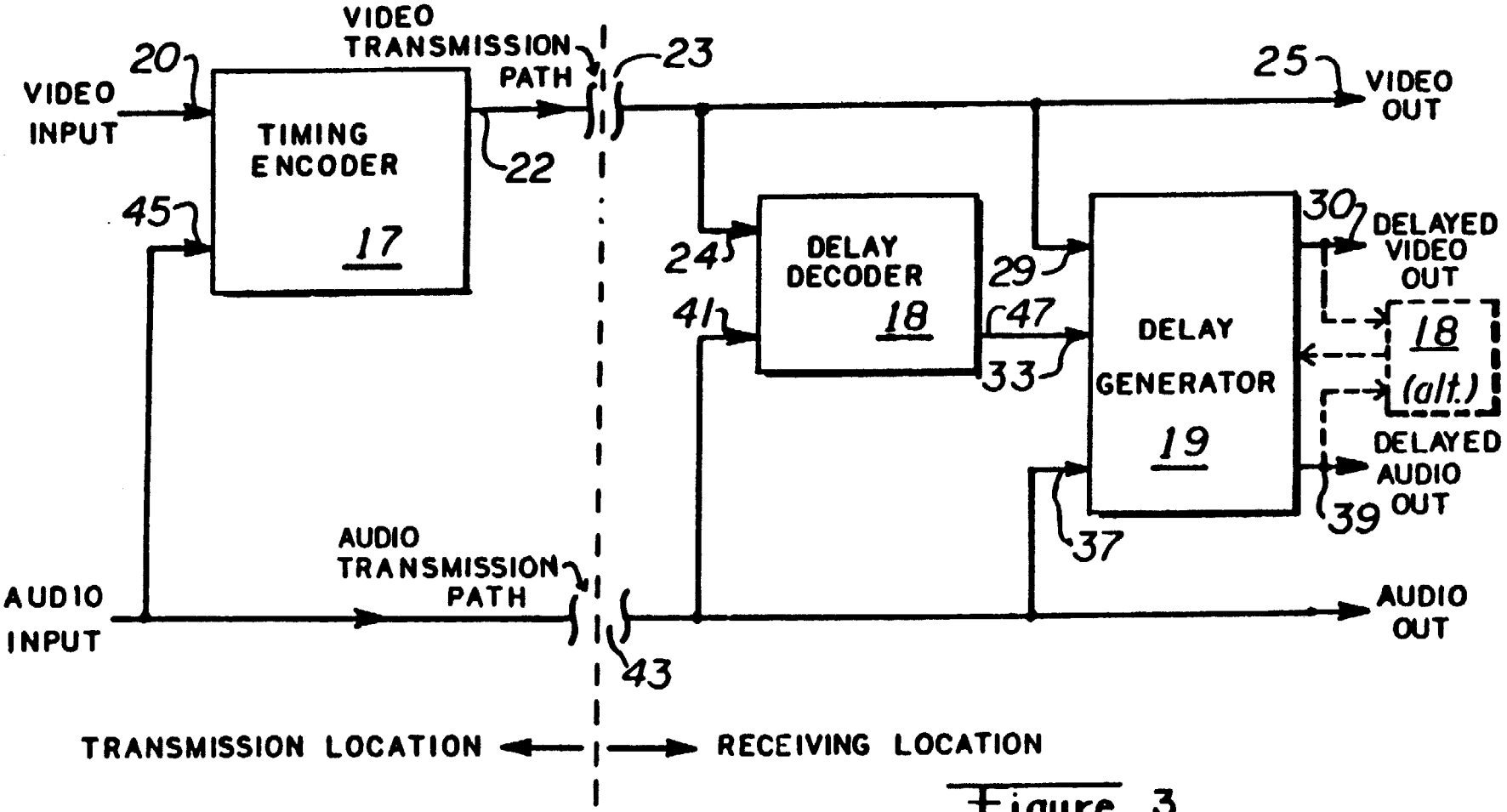
FIG. 3 is a block diagram of the present invention showing recursive and non-recursive forms.

FIG. 3 is the block diagram of a first embodiment of the present invention which may overcome the previously discussed problems of the prior art. FIG. 3 shows a timing encoder 17 responsive to a second associated signal, in this example audio, input on input terminal 45 to generate a timing signal, and combining that timing signal with a first associated signal, in this example video, input on terminal 20, outputting the combined video and timing signal on 22. In the preferred embodiment the timing signal is a digitized version of the audio signal which has been low pass filtered. The combined video and timing signal which has passed through video transmission path 23 is applied to delay decoder 18 at input terminal 24 and to delay generator 19 at input terminal 29. Alternate connection of 18 is shown in dashed lines. If transmission path 23 is to be a video recording device, the combined video and timing signal at 22 may be combined by recording the video and timing signal on the same recording medium as will be discussed later.

Delay decoder 18 is also responsive to audio which has passed through audio path 43 at input terminal 41. In the recursive form of the invention, the audio will have been delayed by 19 before application to 18, in the non-recursive form audio is applied to 18 before delay by 19. Corresponding conditions apply for video. Audio path 43 need not be related to or have the same time delay as video path 23. Delay decoder 18 determines the relative delay between the signals input at 24 and 41 using the aforementioned timing signal and outputs a delay signal from output terminal 47 which is a measure of this delay.

Delay generator 19 is responsive to the combined video and timing signal at input terminal 29 and to audio at input terminal 37 to delay the earlier one of these signals in response to the delay signal at input terminal 33 in order that the video output at output terminal 30 and the audio output at output terminal 39 will be equalized in timing. Delay generator 19 is shown in this preferred form of the invention as having the capability of delaying either the received audio signal at 37 or the received video signal at 29 in order that either may arrive earlier than the other. In a great number of television systems, the received video will always be delayed with respect to the received audio, therefore the video will never need to be delayed. In these systems, the video delay capability of 19 along with terminals 29 and 30 may be eliminated. In other systems, it is desired to only measure the relative delay without any correction and thus the delay generator 19 is unnecessary. As will be obvious to one skilled in the art, delay decoder 18 may be connected at the output of delay generator 19 as shown in dashed lines of FIG. 3, to determine if delayed audio from 39 and delayed video from 30 are properly matched. The delay generator 19 would then be controlled by the delay generator 19 to maintain proper timing. Delay generator 19 could then be placed at the other side of the transmission path if desired. Inspecting the output of the delay generator to control the delay generator is a recursive form of the invention, and inspecting the input to the delay generator to control the delay generator is a non-recursive form. Making the transition from recursive to non-recursive form will be obvious from the present teachings taken with the prior art such as U.S. Pat. No. 4,313,135, so only the non-recursive form will be discussed. It will be understood however that the present disclosure and claims may apply to either form.

Figure 4:
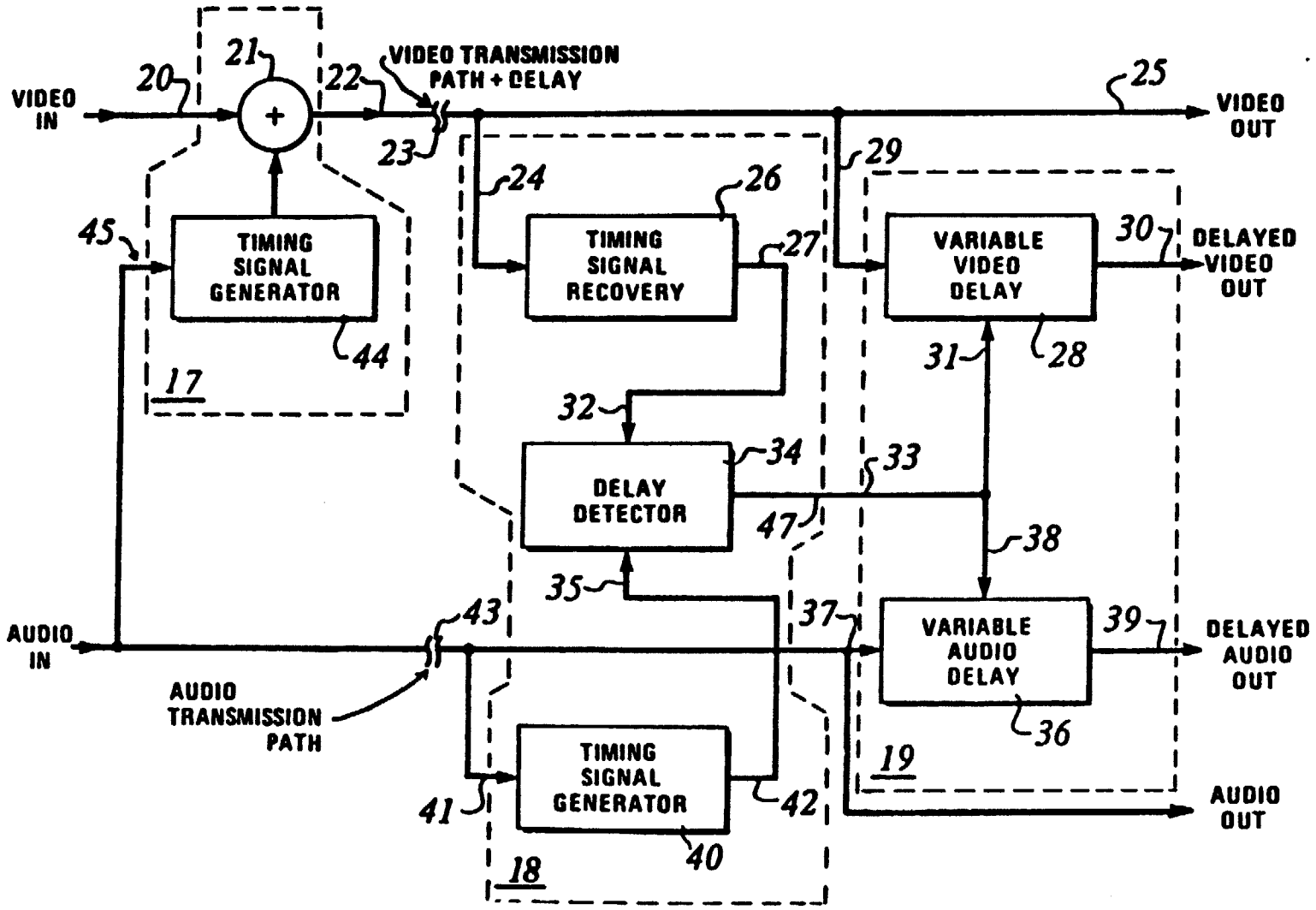
FIG. 4 is a block diagram of a first embodiment of an audio to video timing equalizer system in accordance with the present invention.

FIG. 4 shows a first embodiment of the invention containing a timing encoder 17 consisting of a timing signal generator 44 and a combiner 21. Timing signal generator 44 is responsive to input audio from terminal 45 to generate the aforementioned timing signal which is combined with the video signal input on terminal 20 by combiner 21. The combined video and audio timing signal is then passed through the video transmission path 23 and on to delay decoder 18 and delay generator 19. The audio signal applied to terminal 45 is also passed through the audio transmission path 43 which does not need to be related to video path 23.

At the receiving end of the audio and video transmission paths 23 and 43, a timing signal recovery circuit 26, part of delay decoder 18, which is responsive to video containing the timing signal information input at input terminal 24, recovers the timing signal information and applies it via output 27 to delay detector 34 at input terminal 32. A second timing signal generator 40, also part of delay decoder 18, which is the same as timing signal generator 44, is responsive to audio which has passed through the audio transmission path 43 applied at input terminal 41, to generate a timing signal on output terminal 42 which is applied to the delay detector 34 at input terminal 35. The timing signal output of timing generator 40 at terminal 42 is the same as that which was output by timing signal generator 44 and previously combined with the video in combiner 21.

By way of example, if the delay of 23 is greater than that of 43, the timing signal input to the delay detector at input terminal 35 is therefore the same timing signal that will be input at a later time, corresponding to the delay of the video transmission path, 23, less the delay of the audio transmission path 43, at input terminal 32 of the delay detector. The delay detector is capable of measuring the time delay between the occurance of a particular timing signal sequence at input 35 and that same timing signal sequence which is later input at terminal 32 and outputting a signal responsive to that delay. This delay signal is a measure of the audio to video timing and is output at output terminal 47. The delay signal from 47 is applied via input terminal 33 of 19 to the input of variable audio delay 36 at terminal 38 causing the variable audio delay 36 to delay audio from input terminal 37 by an amount substantially equal to the delay of video present at 24 with respect to audio at 41, and output that delayed audio from output terminal 39 with video delay 28 is set to minimum delay, which delayed audio has the same delay as the video output from the system at terminal 25. The audio to video lip-sync is thereby equalized.

One skilled in the art will immediately recognize that this invention will operate with either audio or video delayed with respect to the other. It is important to note that delay detector 34 measures the relative delay between audio at 41 and video at 24 and thus can accomodate positive and negative changes in relative delay of audio and video which result from changes in the video delay of path 23 or the audio delay of path 43. Appropriate adjustment of delays 28 and 36 is made accordingly. This feature is not present in prior art audio synchronizer devices such as that of FIG. 1. The delay signal output from delay detector 34 may be utilized for a variety of test and measuring functions, as well as or in place of controlling variable delays 28 and 36.

In systems where the audio transmission path delay exceeds that of the video transmission path it is necessary to delay the video signal rather than the audio signal in order to achieve proper audio to video synchronization. In that situation, the output of delay detector 34 is applied to a variable video delay 28 at input terminal 31 and audio delay 36 is set to minimum. The variable video delay operating to delay the video from the transmission path 23, which is applied to its input terminal 29, and to output the delayed video at its output terminal 30. In this fashion, the video may be delayed to match the audio delay which occured in the audio transmission path 43, thereby affecting correct synchronization of television audio and video. Of course, if the video delay is always greater than the audio delay, 28 may be eliminated and vice versa. Either video from 29 or audio from 37 will be utilized for the program material as appropriate. In the preferred embodiment, in those systems where the video delay always exceeds the audio delay, video from 25 and audio from 39 will be used with 28 being eliminated.

In summary, a timing signal which is derived from the television audio signal is combined with the video before the audio and/or video signals are transmitted through the transmission path or processing circuitry to a receiving location which transmission causes unequal audio and video delay times. At the receiving location, this timing signal is recovered from the video and is compared to the timing signal which is again generated from the audio which has been passed through the delay path or circuitry. Because the timing signal, which has been recovered from the video and the timing signal which is generated from the delayed audio are essentially the same signal separated in time, a delay detector can determine the difference in time between the occurance of selected events or patterns of those two signals.

It should be noted that this difference in time corresponds to the actual difference in timing between audio and video at the output of the delays or the transmission paths. It does not necessarily correspond to the delay time of the video path or to the delay time of the audio path. The delay detector then controls either a variable audio delay or a variable video delay or both to delay the audio or the video signal, whichever is earlier, to match the other of the signals. By this process, the audio to video synchronization, or lip-sync, will be restored. In addition, the measure of the delay which is output from the delay detector may be used for test, monitor or measuring functions, for example, to monitor the path length or delay time as a measure of quality of the transmission path.

The timing signal which is encoded in the video need to not be the full bandwidth audio as in the prior art of FIG. 2, since only timing information is required; therefore, the problem of having adequate video blanking intervals is overcome. Also, there is no connection required between video going into the video transmission path, or delay, and the delay detector which may be located at the output of the video transmission path, or delay. Because such a connection is not required, this system is well-suited to preserving a lip-sync for television systems such as satellite and microwave transmission systems which have great distances between their input and output locations.

Figure 5:
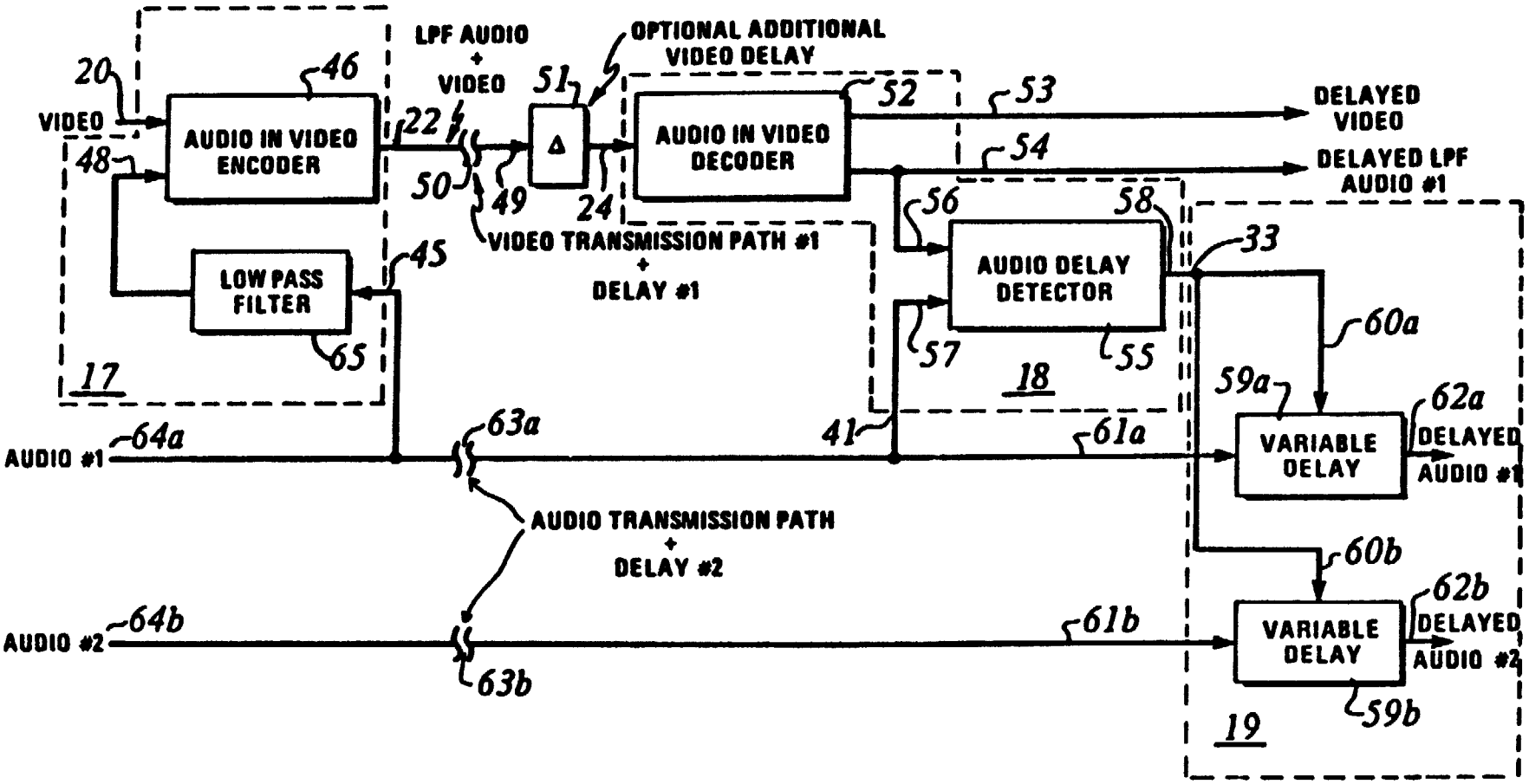
FIG. 5 is a block diagram of a second embodiment of an audio to video equalizer system having two audio channels with a single audio transmission path.

FIG. 5 illustrates an alternate embodiment of the present invention showing an audio to video correction system which may be utilized with one or more audio channels. FIG. 5 shows timing encoder 17, delay decoder 18 and delay generator 19, all having the same purpose as the same numbered sections of FIG. 3, but having different internal functions as compared to the embodiment of FIG. 4.

Audio #1 from input 45 is low-pass filtered by low-pass filter 65 and applied to an audio in video encoder 46 at input 48 where it is combined with video from input terminal 20. The low-pass filtered audio is digitized to an N-bit quantization level, for example 1-bit, thus becoming a timing signal derived from the audio. The timing signal is, in this case, a digitized low-pass filtered audio signal and may still be referred to as low-pass filtered (LPF) audio. Of course, the LPF audio may be digitized to more than a one-bit level as in prior art systems of FIG. 2; however, in the preferred embodiment shown, one bit is sufficient. For the preferred one bit digitization level the audio output on 54 of audio in video decoder 52 will be binary in nature; however, if more than one bit quantization is used the output on 54 may be binary or analog. Either binary or analog audio from 54 may be input to 18 since by use of a timing signal generator such as 40 of FIG. 4, the analog audio signal may be converted to binary for use by the delay detector. The low-pass filtered audio in video which is output from audio and video encoder 46 on output terminal 22, is then passed through the video transmission path and delay 50. At the output of the video transmission path 50, the video containing low-pass filtered audio may be passed through an optional additional video delay 51 having input 49, and then applied to an audio and video decoder 52 via input 24. The audio in video decoder 52 outputs the delayed video, called delayed video because it has been delayed by the transmission path 50, and separates the low-pass filtered audio which is output on terminal 54 corresponding to 27 of FIG. 4.

It should be noted that in FIG. 5 the delayed video output 53 from the transmission path 50 is shown as passing through the delay decoder 18, whereas in FIG. 4 the video output video 25 does not pass through delay decoder 18. This difference is shown because in some systems it is desirable to have the audio information deleted from the video before the video is output from 53. This deletion is performed by 52. If it is not necessary to perform this deletion, then output 53 may be taken directly from input 24 or 49 as will be apparent to one skilled in the art.

Similarly, the video output 25 of FIG. 4 may be taken from the delay decoder 18 as necessary. The low-pass filtered audio is applied to an audio delay detector 55 corresponding to 34 of FIG. 3 at input terminal 56.

Referring again to FIG. 5, audio #1 from input terminal 64a is transmitted through audio transmission path 63a. Audio output from the transmission path is then applied to the audio delay detector 55 at input terminal 57. The audio delay detector 55 detects the delay of audio arriving at input terminal 56 with respect to the audio arriving at input terminal 57. The delay output from audio delay detector 55 on output terminal 58 is then applied via line 33 to variable audio delay 59a at input terminal 60a where the audio #1 signal from the audio transmission path 63a is input via 61a, delayed and output on output terminal 62a. A second audio signal applied at terminal 64b and passing through audio transmission path 63b may also be delayed by variable delay 59b having input 61b in response to the audio delay detector's output which is input at terminal 60b. The delayed audio #2 is output on terminal 62b.

In the system of FIG. 5, the delay given to audio #1 and audio #2, by transmission paths 63a and 63b, is expected to be the same, as will be the delay generated by variable delays 59a and 59b. In order to ensure that audio arriving at audio delay detector input terminal 56 is always delayed with respect to audio arriving at delay detector input terminal 57, an additional video delay 51 may be added to the system. However, if the delay of video transmission path 1 is sufficient to guarantee that audio input to the delay detector at terminal 56 will always be delayed with respect to audio arriving at terminal 57, then the additional video delay 51 will not be necessary, and the video from transmission path 50 will be coupled directly to the input of the audio in video decoder 52 at 24.

Since the audio arriving at input terminal 56 is a low-pass filtered and delayed version of the audio arriving at input terminal 57, it is possible for the audio delay detector to detect the delay, or the time difference, between those two audio signals. Since audio #1, which is encoded in the video in the audio and video encoder 46 is low-pass filtered, only a small amount of the video blanking interval need be used. Since only a small amount of the interval is used for encoding audio, the video may still conform to NTSC specifications. The low-pass filtered audio which is encoded in the video, will be sufficient for recovering timing information; however, it may not be suitable for transmitting program audio information. It may be recognized, by one skilled in the art, that even if the delay time of video transmission path 50 and/or audio transmission paths 63a and 63b are constantly changing, as is the case in many video transmission systems, the audio delay detector 55 will still be able to decode the relative delay between audio at input terminals 56 and 57 and will be able to control variable delays 59a and 59b accordingly, so that audio output from 59a and b will be properly timed to delayed video which is output from terminal 53.

Figure 6:
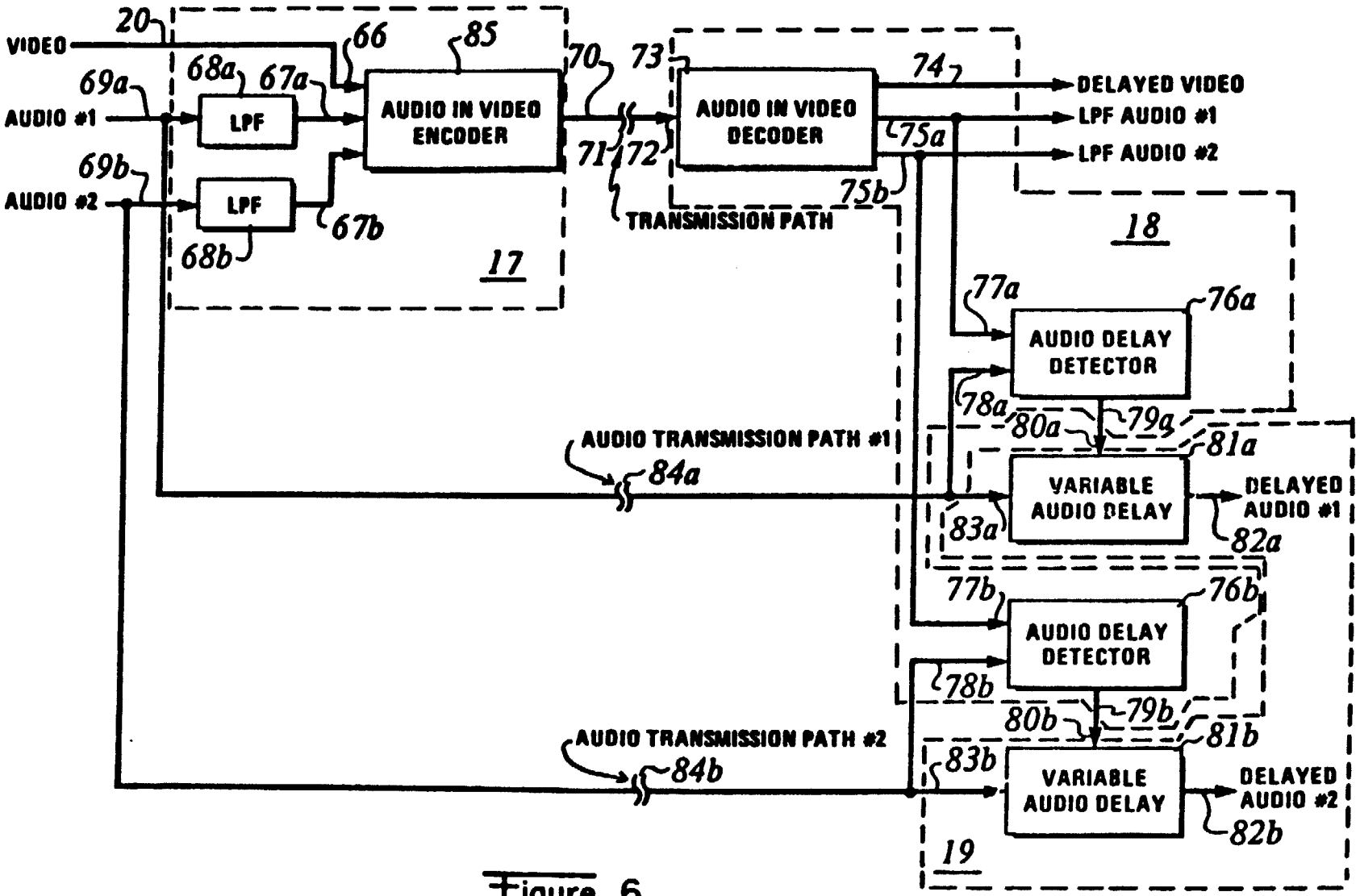
FIG. 6 is a block diagram of a third embodiment of a two-channel audio to video timing equalizer system having two audio transmission paths.

As previously stated, it is expected that the audio transmission paths 63a and 63b of FIG. 5 will give equal delay to audio signal #1 and audio signal #2. FIG. 6 shows another embodiment of the system of FIG. 5 wherein the audio transmission paths may have separate delays.

FIG. 6 shows a two-channel audio to video timing equalizer with timing encoder 17 having audio #1 input terminal 69a and audio #2 input terminal 69b. Audio #1 from 69a is input to low-pass filter 68a and is passed through audio transmission path 84a. Audio #2 from 69b is passed to low-pass filter 68b and to audio #2 transmission path, 84b. Low-pass filtered audio #1 from 69a via 68a is passed to audio in video encoder 85 at audio input terminal 67a. Audio #2 from 69b, which has been low-pass filtered by 68b, is passed to audio in video encoder 85 at terminal 67b.

Video into the system is applied via 20 to audio in video encoder 85 at terminal 66. Audio in video encoder 85 has an output terminal 70 corresponding to 22 of FIG. 3 which outputs video which has had audio timing signals derived from audio at terminal 67a and 67b encoded on it. This video is passed through transmission path 71 and applied to audio in video decoder 73 at terminal 72 corresponding to 24 of FIG. 3.

Audio in video decoder 73 has output terminal 74 which outputs delayed video, output terminal 75a which outputs low-pass filtered audio #1, the timing signal derived from audio #1 and output terminal 75b which outputs low-pass filtered audio #2. Low-pass filtered audio #1 from terminal 75a is also applied to audio delay detector 76a and input 77a.

Audio #1, which has passed through transmission path 84a, is also applied to audio delay detector 76a at terminal 78a, and applied to variable audio delay 81a at input terminal 83a. Delay signal from the delay signal output terminal 79a of audio delay detector 76a is applied to input terminal 80a of variable audio delay circuit 81a. Audio applied at terminal 83a of variable audio delay circuit 81a is delayed and then output via terminal 82a.

Low-pass filtered audio #2 output from audio in video decoder 73 at terminal 75b is applied to audio delay detector 76b at terminal 77b. Audio #2 from transmission path 84b is applied to audio delay detector 76b at input terminal 78b and also applied to variable audio delay 81b at input terminal 83b. Audio delay detector 76b outputs a delay signal at output terminal 79b, which delay signal is applied to audio delay 81b at its input terminal 80b. Audio #2, which was applied to variable audio delay 81b at terminal 83b, is delayed and output on output terminal 82b. The essential difference between the embodiments of FIG. 6 and FIG. 5 is that the low-pass filtered audio #2 timing signal is also encoded in the video signal and subsequently decoded from the video signal after it has passed through the transmission path. Each audio channel will then have its own audio delay detector 76a and 76b and its own variable audio delay 81a and 81b responsive to its individual audio delay detector. In this fashion, the delay times of the two audio transmission paths 84a and 84b may be different and each respective audio delay may compensate accordingly.

As previously discussed, the video delay may not be needed and thus is not shown in FIG. 6. Since low-pass filtered audio is encoded in the video and only enough audio information to recover timing information is required, it is possible to put both audio channels' timing information into the video and still have the video conform to NTSC or other specifications. It would not be possible to encode 20 k Hz 90 db program audio in video meeting NTSC standards in a fashion such that full-quality program audio could be decoded at the output of the transmission path 71. However, according to the teachings of the present invention, only timing information need be encoded which takes up much less space in the video blanking interval than would full bandwidth program audio. From the above teachings it will be apparent to one skilled in the art that by connecting 83a to 77b, delay detector 76b can be caused to equalize the delay between audio #1 and audio #2 if the two audio signals are similar. This arrangement will be useful for correcting phase errors of stereo signals. Several variations of this system will also be apparent from the present teachings, for example sum (Audio #1+Audio #2) or −different (Audio #1−Audio #2) signals can be operated on or used to generate timing information. Pilot tones or other timing signals can also be added to the audio in response to the video in a subaudible fashion, thereby causing the audio to carry the timing information instead of or in addition to the video carried timing information, however it is preferred to operate the system without altering the audio signal.

Figure 7:
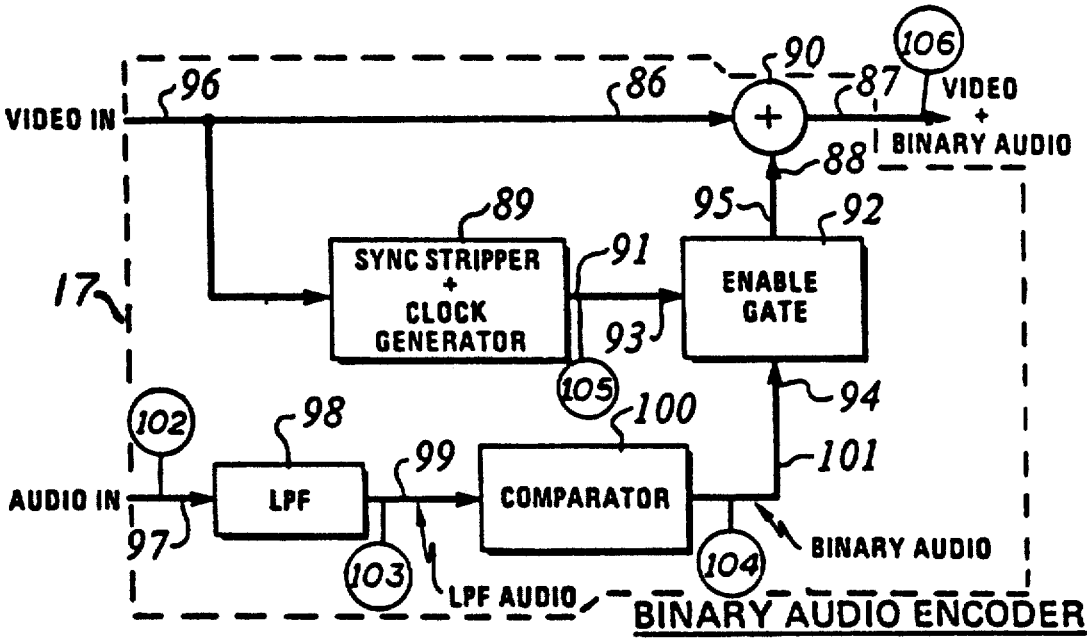
FIG. 7 is a block diagram of a binary audio encoder.
Figure 8:
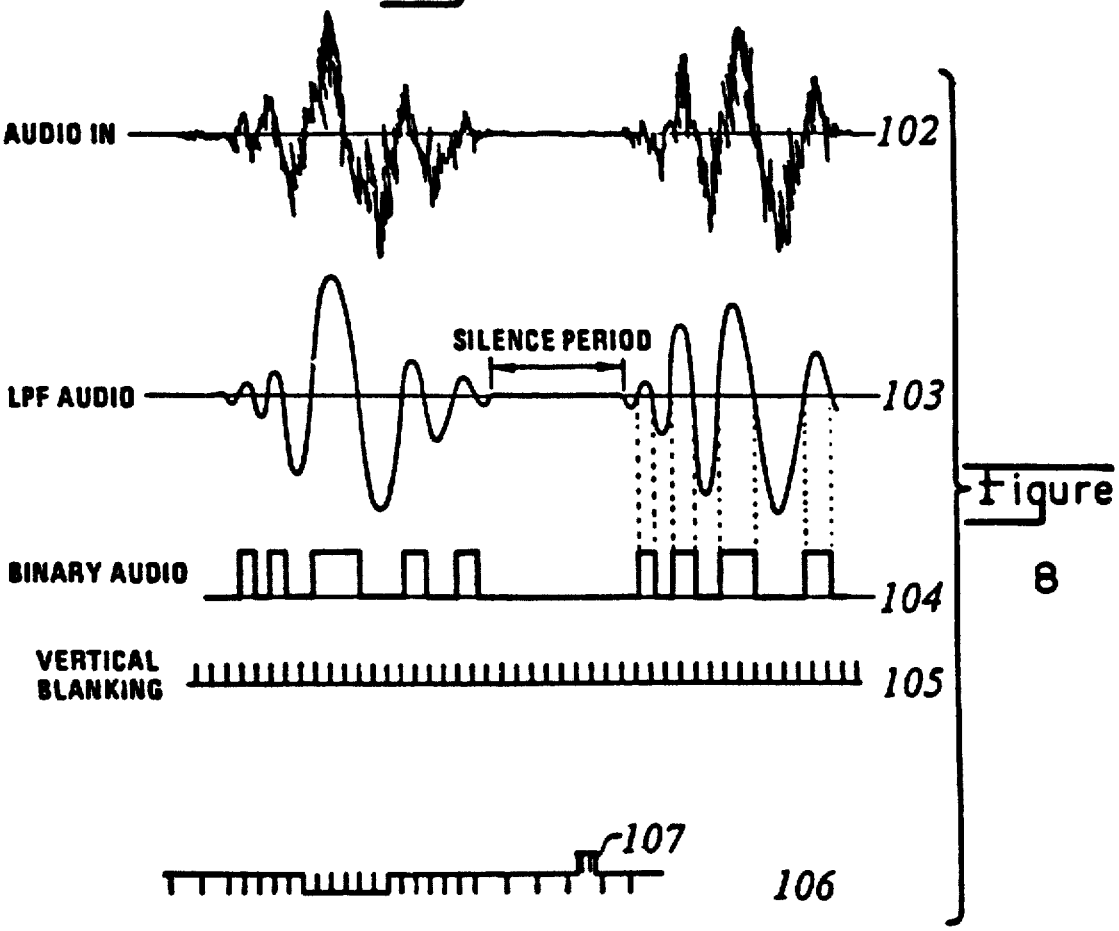
FIG. 8 shows typical waveforms which would be seen at points in the block diagram of in FIG. 7.

FIGS. 7 and 8 show details of a binary audio encoder which gives a more detailed view of element 17 of FIGS. 3, 4 or 5 and their operation. The circuit of FIG. 7 has a video input terminal 96, corresponding to 20 of these figures, and an audio input terminal 97 corresponding to 45. A combined video and binary audio output terminal 87 is shown corresponding to 22. Audio is passed through a low-pass filter 98 corresponding to 65 of FIG. 5.

FIG. 8 shows the audio input at terminal 97 in waveform 102 as might typically be seen. Waveforms 102–105 have the same time relationships along the X axis. The low-pass filter 98 removes high-frequency components and outputs low-pass filtered audio on terminal 99 as would be seen in waveform 103 of FIG. 8. The comparator 100 provides a binary output corresponding to the period in time when low-pass filtered audio is positive. This binary audio output may be seen in waveform 104 of FIG. 8. Note that waveform 104 is high when the low-pass filtered audio waveform 103 is positive and waveform 104 is low when the low-pass filtered audio is negative.

By way of demonstration, the vertical blanking interval of the video input signal applied at terminal 96 is shown at wave form 105. This blanking interval occurs at approximately a 60 Hz rate. The low-pass filtered audio, shown at waveform 103, is low-pass filtered to approximately a 10 Hz 3 db point, as can be seen from this example by comparing the waveform 103 to the waveform 105. The binary audio from comparator 100 on output terminal 101 is applied to enable gate 92 on input terminal 94. The enable gate stores the binary audio from the previous vertical field period, in response to timing signals applied at input 93 from output 91 of the sync stripper and clock generator 89. In response to the timing signals from 89, the enable gate will output the stored binary audio pulses during a selected line of vertical blanking, which pulses are combined with the video which is input on terminal 86 in combiner 90. These pulses would typically be seen as 107 on waveform 106 of FIG. 8, if inspected at output terminal 87. Note that the time scale for 106 is not the same as for 102–105.

Details of inserting digital samples of an audio signal into a video signal will be obvious to one skilled in the art after reading the previously mentioned U.S. Pat. Nos. 4,333,108 and 4,361,852. Enable gate 92 alternately may merely sample the binary audio at input terminal 94 during a selected line of the vertical blanking as determined by sync stripper 89. If binary audio is high during this line, the enable gate 92 will output a pulse at 95 which is applied to the input 88 of the combiner 90 on terminal 88, this pulse being added to the line of vertical blanking of the video signal applied at input 86 and the combined video and pulse output on terminal 87. If binary audio was not high during the selected line of the vertical interval in the second example, no pulse would be output from enable gate 92 and therefore no pulse would be combined with video in combiner 90. The enable gate 92 may be thought of as sampling the binary audio signal at a predetermined interval which, in this example, corresponds to the vertical blanking rate and outputting those samples on output terminal 95 so that combiner 90 combines those samples with incoming video.

As a further embodiment of the system, the enable gate might sample binary audio periodically during the video field, for example six times per field, store those samples, and then during the selected line of vertical blanking output all six of those samples for combination with the video. The number of samples of binary audio which are combined with video on every vertical blanking interval, determines the maximum frequency response of the binary audio when it is recovered from the video after transmission through the transmission path. According to Nyquist's theorem, the maximum frequency of binary audio signal which can be reconstructed is one-half of the sampling rate which the enable gate 92 performs. This maximum frequency determines the accuracy with which delay times can subsequently be determined; however, a sample rate of one sample per vertical will allow a 30 Hz binary audio signal to be reconstructed. This 30 Hz signal is more than adequate for determining delays of most video transmission systems.

As previously mentioned the audio signal can also be digitized to greater accuracy than one bit. This is desirable for improving performance, such as the speed at which the delay decoder 18 can measure the delay, and the ability to measure delay in the presence of noise on the audio or video signals. It is however not necessary as previously explained, to encode full broadcast quality audio. As an alternate embodiment of this system, 89, 92 and 90 can be replaced with a SMPTE Timecode Generator and the binary audio from 101 inserted in the binary data or user bits area of the standard SMPTE/EBU Time Code, with the timecode being encoded in the video vertical interval. The SPMTE/EBU time code can also be transmitted or recorded on a separate channel or track as is well known in the art. Such time code encoding generators with built in video insertion are well known in the art. Companion time code decoding devices which will allow the subsequent recovery of binary audio are also well known.

Figure 9:
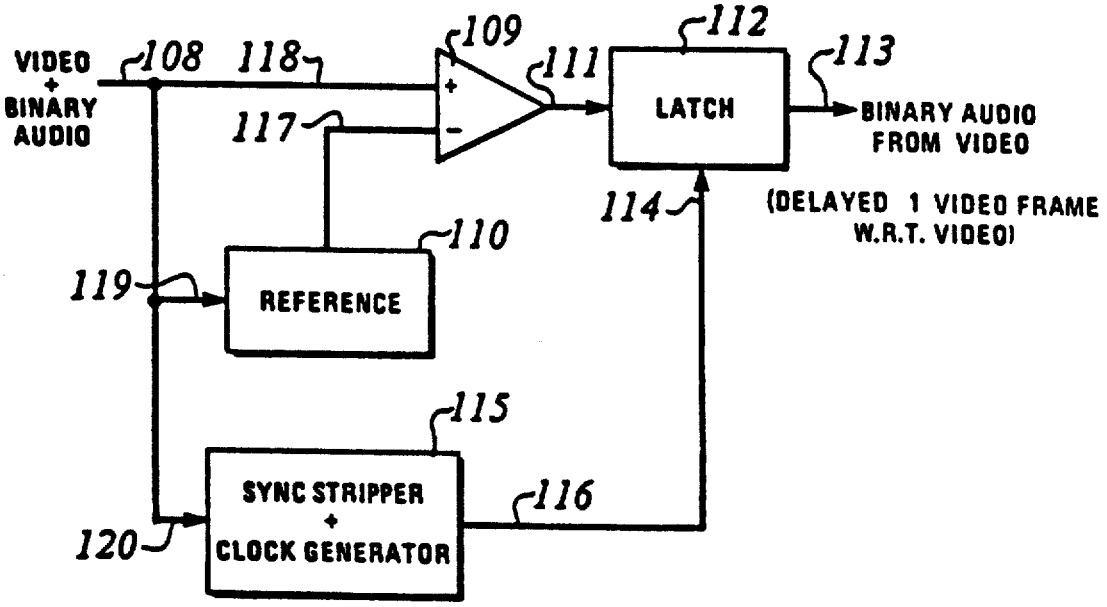
FIG. 9 is a block diagram of a binary audio decoder.

FIG. 9 shows a more detailed drawing of 26 of FIG. 4, or of the major part of 52 of FIG. 5, FIGS. 4 and 5 showing two embodiments of 18. FIG. 9 is a binary audio decoder which is suitable for use in decoding binary audio signals which have been encoded on a video signal by a binary audio encoder such as shown in FIG. 7. Video containing encoded binary audio is input in input terminal 108 and is applied to comparator 109 at 118, to reference circuit 110 at 119, and to sync stripper and clock generator circuit 115 at input 120.

Reference circuit 110 is a peak hold circuit responsive to the video and to the encoded pulses such as that shown at 107 of FIG. 8, to generate a reference 117 which is approximately one-half of the voltage level between the peak of pulse 107 and the blanking level of video. This reference is applied to the negative input of comparator 109. Video is applied to the positive input of comparator 109, therefore the output 111 of 109 will correspond to the period in time when the video exceeds the reference. Sync stripper and clock generator 115 provide timing signals 116 to latch 112 at input 114 so that only the previously encoded binary audio signal from 111 is latched and stored in the latch and any output from 109 which occurs during the active portion of video will be discarded. Latch 112 therefore outputs the binary audio which has been recovered from the video signal and stored at output terminal 113 at a constant rate matching the rate with which the audio was originally sampled in 17.

Figure 10:
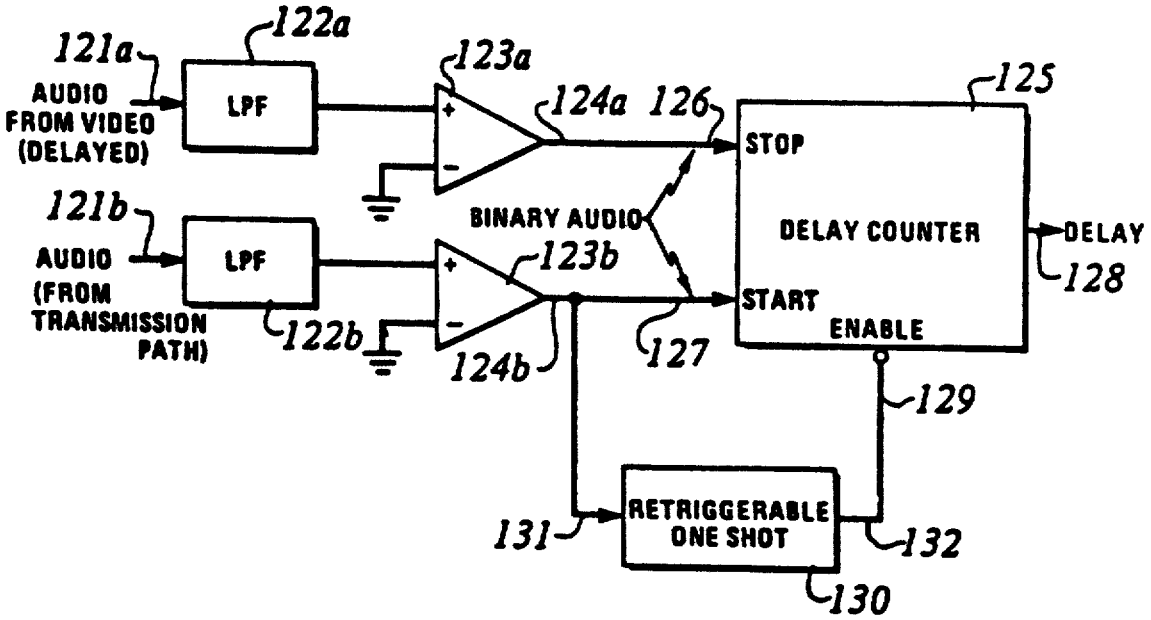
FIG. 10 is a block diagram of a delay detector circuit.

A delay detector, such as that shown as 34 of FIG. 4, or 55 of FIG. 5, is shown in more detail in FIG. 10. Such a delay detector is suitable for determining the delay between two audio signals, such as the binary audio signal output at terminal 113 of FIG. 9, and the output of the binary audio encoder at terminal 101 of FIG. 7. For clarity, the audio decoding system of FIG. 10, receives signals which have passed through that circuitry of FIG. 7 in series of that circuitry with FIG. 9, and is delayed by low-pass filter 122a having input 121a corresponding to 56 of FIG. 5 and comparator 123a of FIG. 10. LPF 122a converts the binary audio from 113 of FIG. 9 back to analog audio, and then comparator 123a converts it back to binary audio at 124a. This apparently redundent exercise is to cause binary audio at 121a to be delayed by the same amount as audio at 121b, as it passes to delay counter 125.

For simplicity of this example the functioning performed by the low-pass filter 98 and comparator 100 of FIG. 7 is duplicated by low-pass filter 122b having input 121b corresponding to 57 of FIG. 5 and comparator 123b of FIG. 10. Low-pass filter 122b and comparator 123b will operate to generate a binary audio signal which is output from 124b. Referring to FIG. 8, the audio input to the low-pass filter at 121b would look like that shown as waveform 102. The audio output of the low-pass filter 122b would look like that of waveform 103 of FIG. 8. The binary audio output of the comparators 123a or 123b, which would be seen at terminal 124a or 124b would look like that at 104 of FIG. 8.

Assuming the audio from video input to 121a is delayed with respect to audio input at 121b, it may be seen that the binary audio at 124a will be the same as that at 124b, but delayed. Of course, the audio from video input at 121a will have been sampled by the action of encoding it in the video; however, the timing information will be accurately reconstructed by the LPF 122a.

Alternately, 122a and 123a may be eliminated with output 113 of FIG. 9 feeding directly into 126 which in this instance would correspond to 56 of FIG. 5. In this situation, care must be taken to ensure that the delay of audio through low-pass filter 122b is small enough to be inconsequential to the overall system preformance, or otherwise that the delay is compensated for. Assuming the audio at 124b looks like the binary audio 104 of FIG. 8, it may be seen that occasionally periods of silence will cause no outputs to be seen at 124b for some period of time. A retriggerable one-shot 130 having output 132, is responsive to binary audio from 123b on input 131, may be caused to retrigger to the normally present binary audio and to time-out when a silence period of some predetermined length of time, which has been preset at the one-shot, has occured.

In this embodiment, the silence period is preset at the one-shot 130 to be greater than the maximum audio delay, which can be experienced by audio on the video passing through the video transmission path, then when the retriggerable one-shot 130 times out, thus enabling the delay counter 125 at input 129, the audio delay period will also have started and be present at the stop input of the delay counter 125.

The delay counter 125, having been previously enabled by the time-out of retriggerable one-shot 130, will now start counting as soon as binary audio in the relatively undelayed channel appears again at input terminal 127. The counter will continue to count at a known, predetermined rate until the same binary audio appears at some delay time later at terminal 126, which stops the delay counter 125. The number of counts the delay counter has counted between the start and the stop then corresponds to the delay time between audio input at 121b and audio input at 121a.

The count from 125 may then be converted to a delay time since it was originally counted from a known frequency source and that delay time is output on output terminal 128 corresponding to 58 of FIG. 5. The delay time may be held at output terminal 128 until the retriggerable one-shot 130 again times-out during a silence period causing the delay counter to count a new delay count which is then applied to the output terminal 128.

As one skilled in the art will recognize, the function of the delay counter is easily implemented using standard TTL logic-type parts. Alternately, a small microprocessor could be used to perform the delay count and the retriggerable one-shot function.

The operation of the audio delay detector is such that, in a system, the input terminal 126 would receive delayed binary audio such as is available from output terminal 113 of FIG. 9. The start input terminal 127 and the input terminal of the retriggerable one-shot 131 would receive binary audio such as would be available from the output of comparator 100 of FIG. 7.

Referring to FIG. 4 for the system block diagram of the first embodiment, if the delay detector of FIG. 10 were used in the FIG. 4 embodiment, delay detector input terminal 32 would correspond to delay counter input terminal 126 and delay detector input terminal 35 would correspond to delay counter input terminal 127 and one shot input 131. Delay counter output terminal 128 of FIG. 10 would correspond to output terminal 47 of FIG. 4. Timing signal recovery 26 would be that circuit of FIG. 9 and timing signal generator 40 would correspond to 122b and 123b of FIG. 10.

Figure 11:
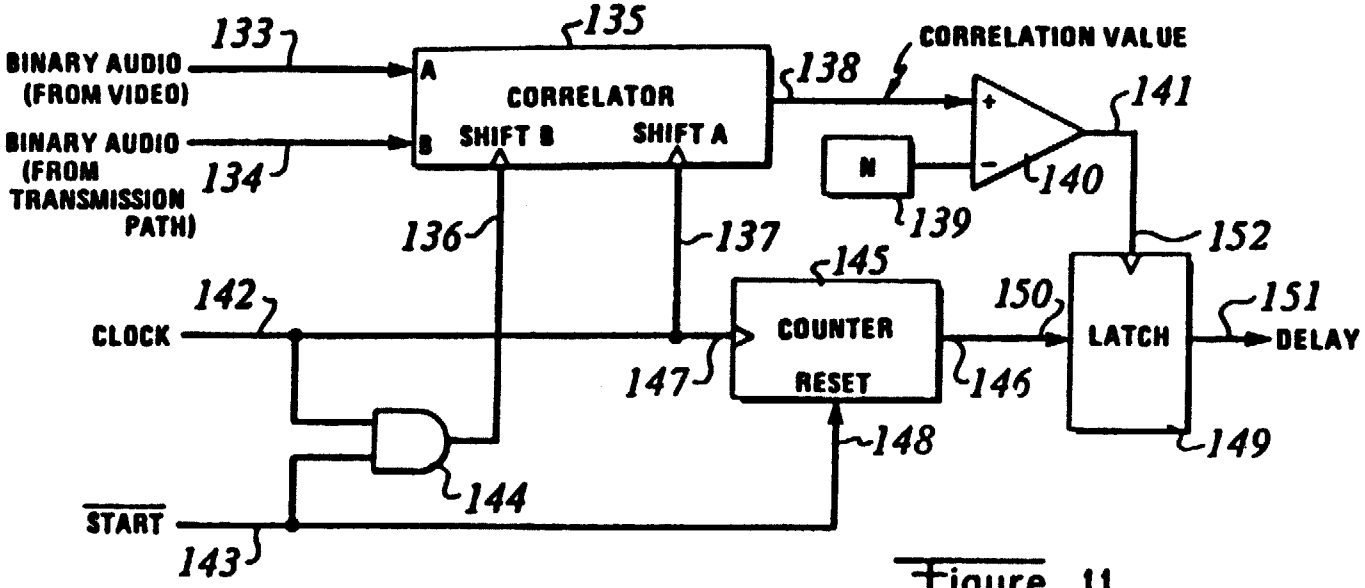
FIG. 11 is a block diagram of a correlator type delay detector circuit.

FIG. 11 shows an alternate delay detector constructed around a correlator circuit 135. This delay detector is suitable for use as 34 of FIG. 4 or with LPF and comparator such as 98 and 100 of FIG. 7 added to input 134, suitable for 55 of FIG. 5 or 76a and 76b of FIG. 6. Phrased another way, the circuit of FIG. 11 can replace 125 and 130 of FIG. 10.

The correlator circuit 135 operates to shift in a first correlation signal into input A from input 133 according to a shift A clock present at input terminal 137 and to shift in a second signal from terminal 134 into input B with the shift B clock at terminal 136. A measure of the correlation, or the number of cell-matches between these two signals A and B, is output at output terminal 138. If there is a perfect match, then the output at 138 corresponds to the number of cells of length of the correlator in this example 64. If there is perfect disagreement between the signals A and B, then the output from 138 is equal to 0.

Briefly, the correlator circuit operates to store a portion of the earlier signal, continuously inspect the later signal as it arrives and flag when the later arriving signal's pattern matches the stored signal's pattern. This match indicates that the stored portion of the earlier arriving signal is the same as the later signal. The time delay between the storage of the first signal and the match corresponds to the relative delay between the two signals.

An example of such a correlation device is the commercially available TRW TDC 1023. For more information on the operation of such devices and their use in this application one may receive an application note on the part and on correlation techniques in general from TRW LSI products in La Jolla, Calif.

Binary audio corresponding to the delayed audio is input to terminal 133. This input terminal corresponds to terminal 126 of FIG. 10 and 32 of FIG. 4. Binary audio in the relatively undelayed form is input at terminal 134 corresponding to terminal 127 of FIG. 10 and to 35 of FIG. 4. A clock signal of known period, preferably that of the signal which is applied to 133, is applied at input terminal 142. A start signal is applied at input terminal 143. To start the sequence, the start signal goes active low after at least sixty-four (corresponding to the length of correlator 135) clock signals have been applied at terminal 142. The start signal going low causes the shift B clock at terminal 136 to stop due to the action of AND 144, thereby stopping the shifting of binary audio input from the B input, terminal 134. The start signal going active low also removes the active high reset from counter 145, which starts counting clock pulses input from 142, which are also input to the counter at terminal 147.

The counter then counts the number of clock pulses which are used to shift binary audio input at terminal A of the correlator and outputs this count on terminal 146. The correlation value and output at terminal 138 from the correlator then becomes a measure of the correlation between the moving binary audio signal A and the stored, or fixed, binary audio signal B. As soon as binary audio A matches binary audio B, a sixty-four will be output from the correlator at output terminal 138, the sixty-four corresponding to a perfect match between A and B in the correlator and will happen when the moving audio pattern on input A matches the stored pattern from B. This perfect match will happen when enough shift A clocks have been applied to the correlator to cause the delayed audio input at terminal 133 to match in time the stored audio which was previously input at terminal 134. Since the length of correlator 135 is sixty-four cells, the comparison number N for this example will be set to sixty-four. This number is represented by 139 of FIG. 11, which is applied to one input of comparator 140. The other input of comparator 140 is the correlation value. When the correlation value matches the number N, an output high signal will be output from terminal 141 of the comparator. The output high signal from terminal 141 via latch clock input 152 causes latch 149 to latch the present counter number which is input to it on terminal 150 from counter 145 output 146. This counter number was the number of clocks required to shift binary audio A to the point where it matches binary audio B which was previously stored in the correlator. The count was therefore a measure of the delay of binary audio A with respect to binary audio B in the correlator. The latched count from counter 145 is output on terminal 151 and is a measure of the delay that the audio which was encoded on the video has experienced with respect to the audio which was transmitted via the separate transmission path.

When a count has been latched in latch 149, the start signal at 143 may be taken to the high state, causing a new binary audio sequence B to be shifted into 1071 the correlator and causing counter 145 to be reset to 0 via reset terminal 148. After the correlator has received sixty-four or more clock pulses on shift B input 136, the start signal may again be taken to the low state starting the process over again.

It has been assumed for the above explanation that the signal at 133 is delayed with respect to that at 134. If, however, the signal at 134 is delayed, then the connections of 133 and 134 to inputs A and B of 135 should be reversed. If it is not known which is delayed, such may be determined by trying first one connection and if not receiving a proper output on 138 within a reasonable number of clocks, reversing the connections and again looking for a proper output at 138 or by using two such circuits. Such switching may be performed by an electronic double pole double throw switch such as a 74157.

In some applications, due to noise which is imparted to audio either through the audio transmission path, or audio which is encoded in the video, a less than perfect match will be made at the proper correlation point. This will result in correlator 135 outputting a number which is lower than sixty-four at output terminal 138. In this instance, a number lower than sixty-four will be required at the reference in 139. The lower number will allow operation in the presence of noise and still maintain a high degree of immunity from false correlation pulses due to the somewhat random nature of the input audio signals. Also, one may wish to average the results of a number of correlation trials in order to reduce the effects of noise and false correlations.

The clocking signal applied to 142 is preferred to be that which has been used to recover binary audio from the video, however it may be selected to be a frequency which is convenient in order to provide a delay output from terminal 151 which is matched to the delay required by the audio delay circuitry. For example, if the clock input at terminal 142 had a frequency of 1 KHz, then the delay output from terminal 151 would correspond to the number of milliseconds of delay of binary audio input at terminal 133, with respect to binary audio input at terminal 134. In any event, the delay of the two signals may be determined from the count which is held in the latch 149 and the period of the clock applied at 142.

One skilled in the art will easily be able to determine the proper clock frequency for a given application and to build proper control circuitry to generate the start signal applied at input terminal 143. For ease of explanation, the fact that the binary audio which is recovered from video may be delayed by one video field has not been addressed. In a system where the gate 92 of FIG. 6 stores more than one binary audio sample per video field, the binary audio subsequently recovered from the video will contain this storage delay. This storage delay, if it is a significant amount, should be subtracted from the delay output from the delay detector by utilizing a common digital adder circuit.

Several commercially available parts would be suitable for the functions shown in FIG. 11, for example, the reference number 139 could be set with a dip switch, the comparator 140 could be made of a 74LS684, the latch 149 could be constructed of a 74LS374, the counter 145 could be constructed of a 74LS491, the AND gate could be constructed of a 74LS08, and the correlator 135, as previously mentioned, could be constructed of a TRW TDC 1023.

Figure 12:
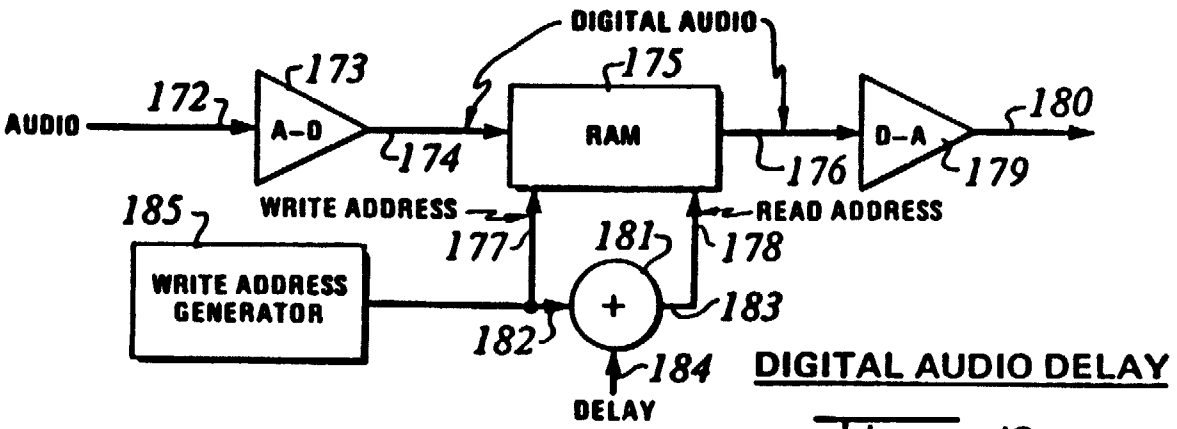
FIG. 12 is a block diagram of a digital audio delay.

FIG. 12 shows a digital audio delay suitable for delaying audio signals in response to the delay output of the delay detector of either FIG. 11, or of FIG. 10 and may be used for 36 of FIG. 4, 59a or b of FIG. 5, or 81a or b of FIG. 6. The digital audio delay has an audio input terminal 172, which corresponds to terminal 37 of FIG. 3, an audio output terminal 180, corresponding to 39 of FIG. 3, and a delay input terminal 184 corresponding to 33 of FIG. 3.

Audio input on terminal 172 is digitized in the A-to-D converter 173 and digital audio 174 is then stored into RAM 175 in response to a write-address generator 185 which applies a write address at write-address terminal 177. The write address at input 182 is modified in adder 181 by the delay count input at terminal 184. This delay could be the same delay output, shifted by several bits or scaled in a PROM from terminal 151 of FIG. 11, or output from 128 of FIG. 10. The adder 181 adds the delay input at terminal 184 to the current write address input at terminal 182 and outputs a read address on terminal 183. This read address is applied to RAM 175 at the read address input terminal 178.

In operation, digitized audio input to the RAM from 174 is written into a write-address location, for instance, in this example, location 0. The write address generator continues causing the write address to change with new digital audio samples being written into subsequent decreasing addresses in the RAM. At some point in time later, the sum of the then-current write address and the delay input on terminal 184 will be equal to 0 which will become the read address for the RAM. At that point in time, the previously written digital audio at address location 0 is read from the RAM and output on terminal 176. This digital audio which is read from the RAM is then applied to the D-to-A converter 179, and converted back to analog audio which is output on terminal 180.

One can see that if the delay applied to 184 is 0, the RAM will read and write from the same address; therefore, the digital audio written into the RAM is immediately read out of the RAM and passed to the D-to-A converter. The net delay, then, for storage time through the RAM will be 0. If the delay number applied at 184 is increased, then the distance between the write and the read addresses will be increased causing the delay through the RAM to increase correspondingly.

Several digital audio delay devices operating on this principle are available in the marketplace today, one such device being the Lexicon PCM 42 digital delay unit. The delay period is generally set by front panel thumbwheel switches in these devices. One skilled in the art will find it relatively easy to replace the front panel delay control of such a device with the delay signal output from the delay detector. Alternately, it would be relatively easy to build a dedicated digital audio delay from commercially available parts, as would be readily apparent to one skilled in the art.

Figure 13:
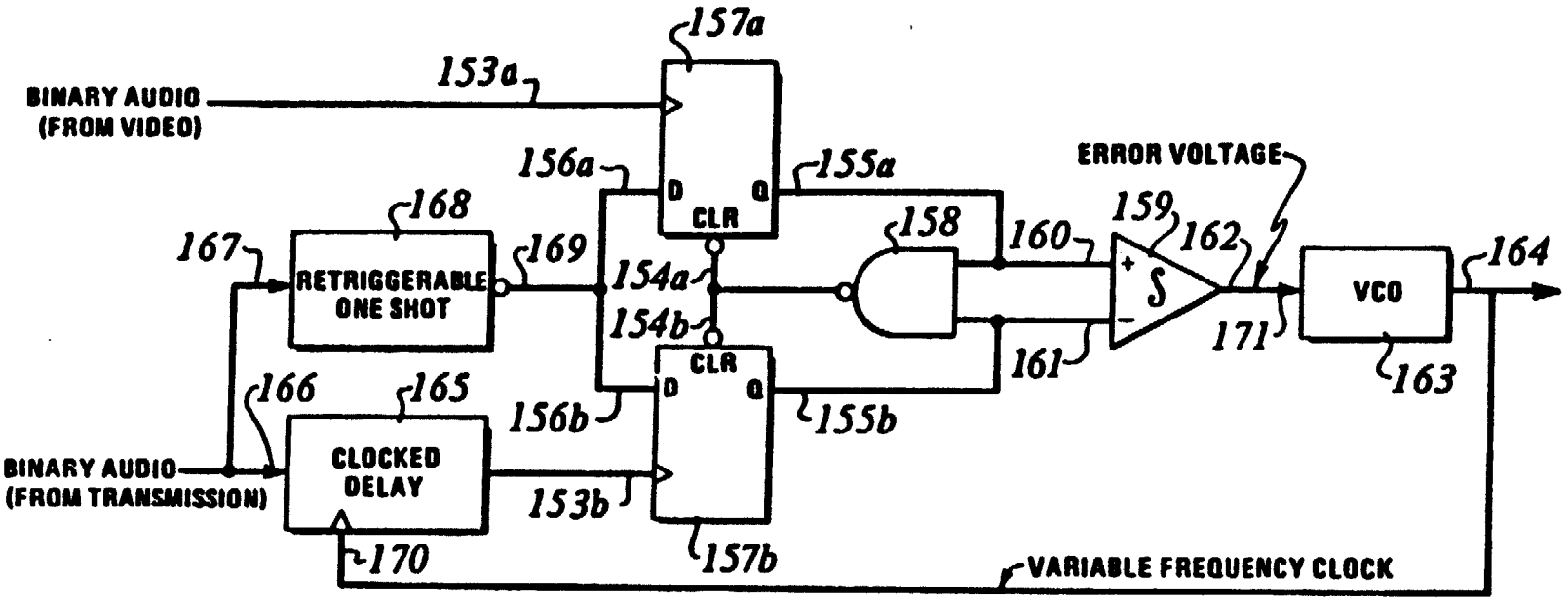
FIG. 13 is a block diagram of a variable frequency clock delay detector.

FIG. 13 shows an alternate delay detector, part of delay decoder 18, which may be used as 34 in the embodiment shown in FIG. 4 or with the addition of an LPF and comparator as 55 of FIG. 5 or 76a or b of FIG. 6. FIG. 13 shows a phase-lock loop type delay detector which generates a variable-frequency clock whose frequency is responsive to the delay between the two binary audio signals.

The relatively undelayed binary audio signal is applied at terminals 166 and 167 corresponding to 35 of FIG. 3. Terminal 167 is the input to a retriggerable one-shot circuit 168, operating the same as that shown in FIG. 10. The retriggerable one-shot times-out after a period of silence which is greater than the maximum delay that the delayed binary audio can receive from the transmission path and enables the D-type flip-flops 157a and 157b at their B inputs 156a and 156b, respectively.

For the purpose of explanation, assume the VCO (Voltage Controlled Oscillator) 163 has been operating at a frequency which causes clocked delay 165 to clock binary audio from input terminal 166 to the input 153b of D flip-flop 157b with a delay such that it is coincident with the occurance of the same binary audio input to D flip-flop 157a. In other words, the delay of clock delay 165 exactly matches the delay of binary audio which has been recovered from video which has passed through the video transmission path. Assuming the one-shot 168 has enabled 157a and b's D-input, or applied an active high signal to them, both 157a and b will simultaneously clock that high to their Q outputs on terminals 157a and 157b. The two high signals applied to NAND gate 158 will cause the output of NAND gate 158 to go low which correspondingly causes D flip-flops 157a and 157b to be cleared by the clear input terminals 154a and 154b. The net effect is to generate two very short, high-going pulses output from the D flip-flops at 155a and 155b.

These pulses will be equal in duration corresponding approximately to the propagation delay through 158 and the clear propagation time of 157a and b. Since the pulses are equal in duration and applied to integrator 159, one to the positive integrating input 160 and one to the negative integrating input 161, the net change of the integrator will be 0 and the voltage output from the integrator on terminal 162 and applied to the VCO at input 171 will remain constant; therefore, the voltage-controlled oscillator frequency output at 164 from 163 will remain constant. As will be apparent to one skilled in the art, the integrator 159 could also be an amplifier, changing the loop order from 3 to 2. This output 164 corresponds to 47 of FIG. 4.

Now assume that binary audio from the video input on terminal 153a corresponding to 32 of FIG. 4 advances slightly from its previous position. The retriggerable one-shot at the next silence period will enable 157a and 157b, binary audio applied at 153a will cause flip-flop 157a to clock, outputting a high at terminal 155a. This high causes the error integrator to charge in the positive direction because there has not yet been a corresponding high from D flip-flop 157b. The integrator will continue to charge until the delayed clock is applied to terminal 153b, the clock input of D flip-flop 157b. At that time both D flip-flops will be cleared, as previously discussed.

In the meantime, however, the integrator 159 has been caused to charge in the positive direction, due to the earlier binary audio pulse being applied on 153a. The error voltage output from the integrator output terminal 162 will then cause the VCO 163 to oscillate at a higher frequency than previously, causing the variable-frequency clock, output on terminal 164, to oscillate faster which causes the clock delay 165 which has the VCO clock input at 170 to shorten in delay time. The shortened delay time of clock delay 165 has the effect of advancing the pulse applied to 157b, therefore bringing it back into coincidence with the previously advanced pulse applied at input terminal 153 and to the clock input of 157a. The net result is that the clock edges input to 157b are always maintained in synchronism with the edges at 157a's clock input.

Figure 15:
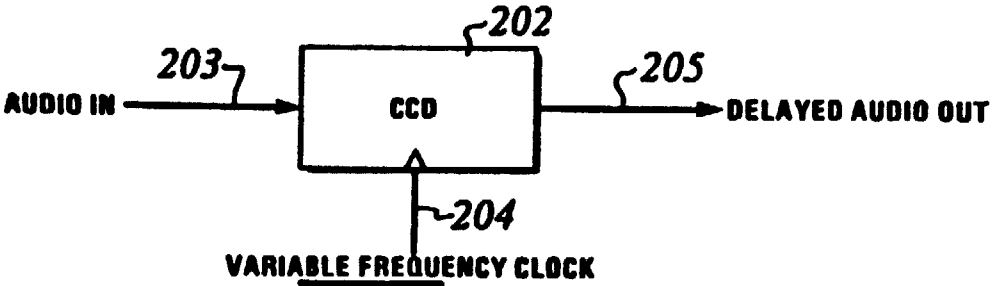
FIG. 15 is a block diagram of a charge coupled device, variable frequency clock, and audio delay.

The frequency of the variable-frequency clock output from terminal 164 corresponding to 47 of FIG. 4 is then proportional to the relative delay of binary audio input at 153, with respect to binary audio input at 166. Whenever the delay increases, the clock frequency decreases, so as to maintain coincidence at the two clock inputs of 157a and 157b. This variable-frequency clock can be used to drive a variable-frequency audio delay such as shown in FIG. 15. Alternately, Delay 165 can be the delay generator 19 of FIG. 3 in a recursive configuration. Delayed audio corresponding to 39 of FIG. 3 would come from the output of 165.

FIGS. 10, 11 and 13 all show delay detectors which can be used as delay decoder 13 of FIGS. 3, 4, 5 or 6. One skilled in the art will recognize that the inputs to all three of these delay detectors as shown is digital. The audio input 41 of FIGS. 3–5 and 78a and b is an analog audio signal and must be filtered and converted to digital by a timing signal generator such as 40 of FIG. 4. Also, as previously mentioned, the audio from video 56 of FIG. 5 and 75a and b of FIG. 6 could be analog and thus be converted by a circuit such as 40 for use by the delay decoders.

FIG. 15 shows a charge-coupled device used as a variable clock audio delay suitable for use as 36 of FIG. 4. The CCD device 202 has an audio input terminal 203 corresponding to 37, a delayed audio output terminal 205 corresponding to 39, and a variable-frequency clock input terminal 204 corresponding to 38. The variable-frequency clock input to 204 would be the same as, or a multiple of the variable-frequency clock output from 164 of FIG. 13. For this example, it will be assumed, however, that it is the same variable-frequency clock.

The length of clocked delay 165 is chosen to be the same number of cells as the length of charge-coupled device 202, in this example, 1024. The circuitry of FIG. 13 will cause clock delay 165 to delay binary audio input at 166 by this proper amount needed to make it coincident with binary audio input at 153. If the CCD device 202 has the same number of cells as 165, the audio input to it will also be delayed by the same amount as the two devices 165 and 202 are driven from the same clock. Therefore, the audio will be delayed by the proper amount to make it correspond to the video from which the binary audio input to 153 of FIG. 13 was taken.

Figure 14:
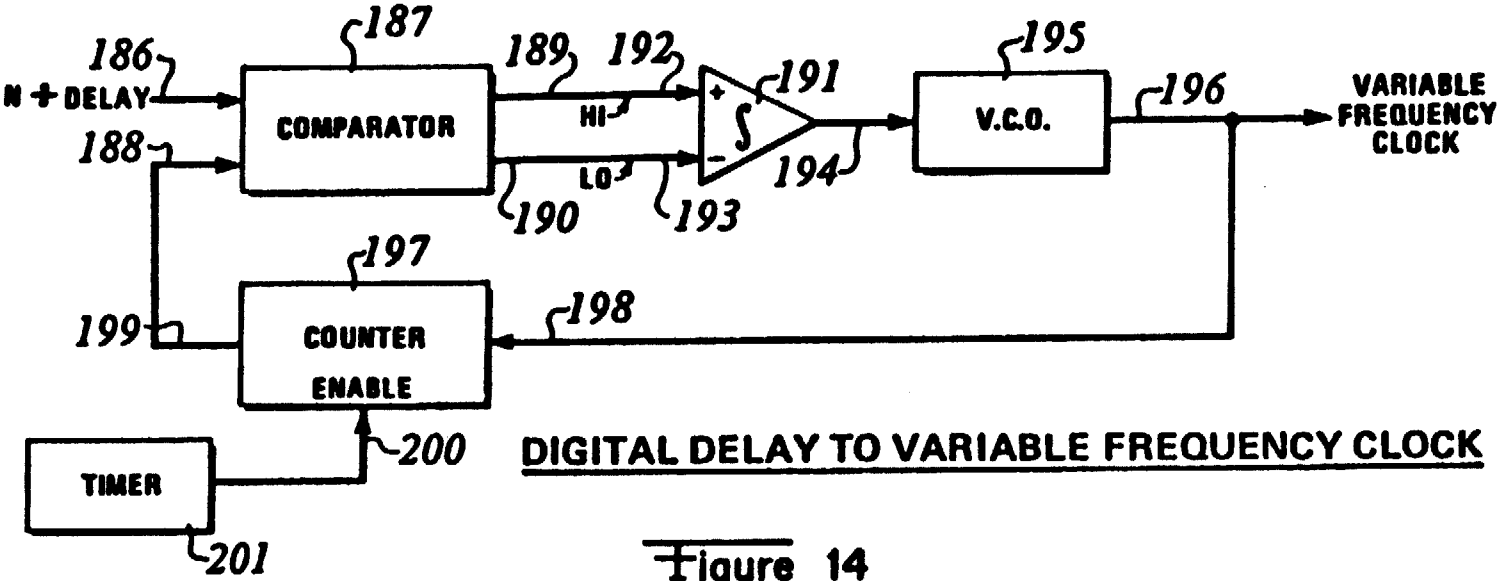
FIG. 14 is a block diagram of a digital delay to variable frequency clock circuit.
Figure 16:
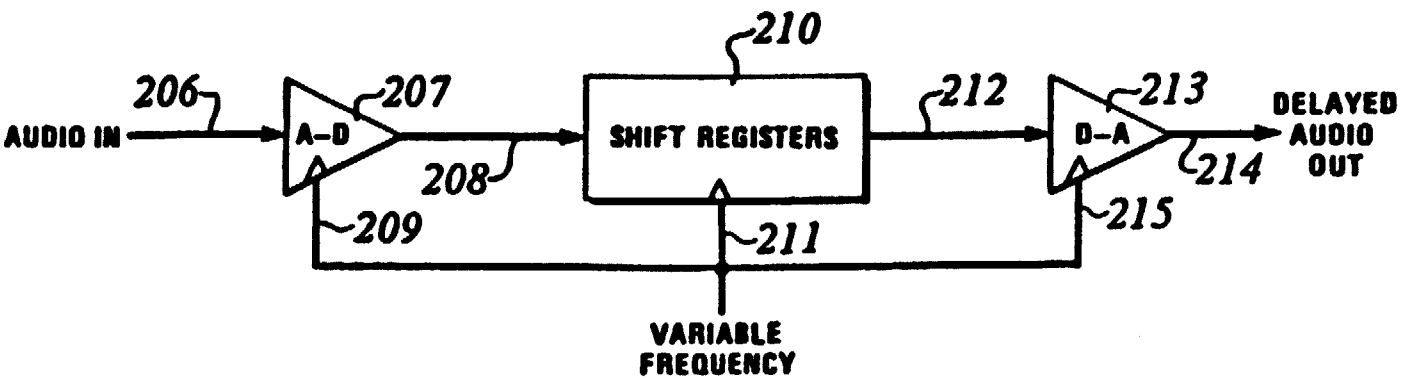
FIG. 16 is a block diagram of a variable frequency clock audio delay utilizing digital shift registers.

FIG. 14 shows a circuit by which a digital delay number, such as that number which is output from terminal 151 of FIG. 11 can be converted to a variable-frequency clock suitable for driving a variable-frequency delay such as shown in FIGS. 15 or 16. The circuit of FIG. 14 can be included in either 18 or 19 of the embodiments of FIGS. 3 through 6 in order to allow the use of variable clock frequency clock delays with delay detectors which output a digital number as the delay output.

FIG. 14 contains a comparator 187 having an input terminal 186 to which is input the quotient of the maximum number the delay can obtain at maximum delay (N) divided by the delay at a given instant. For example, if the delay detector can have a maximum output of 1,000, corresponding to a 1,000-millisecond delay, then the number input to comparator at 186 is 1,000 divided by the actual delay output. If the delay output were 500, then the number input to comparator 187 would be two. If the delay output of the delay detector were to be 250, then the number entered into comparator 187 on terminal 186 would be four. Comparator 187 compares the number entered at terminal 186 to the number entered at terminal 188. If the number at 186 is larger, the comparator outputs a high level on output terminal 189. If the number at 186 is smaller, then the comparator outputs a high level on terminal 190. If the numbers are equal, the comparator has no output from either 189 or 190.

Outputs 189 and 190 are coupled to the input terminals 192 and 193, respectively, of integrator 191. Input terminal 192 is a positive integration input which will cause the output of the integrator 191 to increase in voltage when there is a high level present at terminal 192. Terminal 193 causes the output of the integrator to decrease in voltage when there is a high present at terminal 193. If neither terminal has a high present, then the output voltage of the integrator remains constant. The output terminal of the integrator 194 couples the output voltage to the input of a voltage-controlled oscillator 195. It will be apparent to one skilled in the art that integrator 191 could also be an amplifier thus changing the loop order from 3 to 2 or for use with an audio delay having an integrating characteristic, i.e. where the delay corresponds to the integral of the clock frequency deviation rather than directly to the frequency.

The frequency of the clock output from the voltage-controlled oscillator (VCO) on terminal 196 is proportional to the voltage on the input of the voltage-controlled oscillator from terminal 194. If the voltage at terminal 194 increases, the frequency of the clock output from terminal 196 will also increase.

The variable-frequency clock from terminal 196 is applied to the clock input terminal 198 of counter 197. Counter 197 is caused to clear and then count for a finite period of time in response to timer 201. Timer 201 inputs a control signal to counter 197 at the counter enable input 200. The output of counter 197 at the end of the timed period is applied at output terminal 199 to input terminal 188 of the comparator 187.

In the example given, where the maximum delay can be 1,000, corresponding to 1,000 milliseconds, the timer 201 would have a timing period during which counter 197 is allowed to count for one millisecond. Assume if you will that the delay is 500 milliseconds; therefore, the number input to terminal 186 will be two. The comparator 187 will cause the integrator to charge up or down until the VCO frequency is exactly 2 KHz. The 2 KHz clock, when feeding counter 197 for the timer period of one millisecond, will give an output of two on terminal 199, corresponding to the two on terminal 186 of the comparator input.

It can be seen that if the number input on 188 is too low, corresponding to the variable-frequency clock being too slow, the output of the comparator will cause the integrators output to charge higher, thus increasing the frequency of the VCO. Conversely, if the number input at 188 is to large, the comparator will cause the integrator to charge in a negative-going direction, thereby lowering the frequency of the VCO.

For another example, assume that the delay which is output from the delay detector is 250 milliseconds out of a possible maximum of 1,000milliseconds. The number input at terminal 186 will then be four. The comparator, integrator, and VCO will then operate to adjust the variable-frequency clock frequency so that the number of clock cycles counted by counter 197 during the 1-millisecond enable period will be equal to four. This four is output by terminal 199 to comparator input terminal 188.

The variable-clock frequency required to give an output of four during the 1-millisecond time period is 4 KHz. The variable-frequency clock output from terminal 196 can be applied to a clocked audio delay, such as the CCD device shown in FIG. 15. Assuming that the CCD device 202 has a length which corresponds to the maximum delay which can be output from the delay detector, in the previous example 1,000, the CCD device will then delay the audio input signal at 203 by an amount equal to the delay which is output from the delay detector, and output the delayed audio signal on terminal 205.

The numbers given, of course, may not be very practical for an actual application, as a clocking frequency of 1 KHz would not be sufficient to pass a normal audio frequency signal associated with a television program. In this instance, the length of the CCD would need to be increased and the clocking frequency applied to CCD increased accordingly. For example, if it were desired to clock this CCD at a minimum clocking frequency of 10 KHz, instead or 1 KHz given at the previous example, then the CCD would need to be made 10times as long as the 1,000-section device given previously.

In order to insure proper operation of comparator 187, the time length of timer 201 would need to be decreased by one-tenth to correspond to the ten-times higher variable-frequency clock. By way of the previous explanation and examples, one skilled in the art will be able to construct a system utilizing the digital delay to variable-frequency clock converter of FIG. 14 and a variable frequency clock audio delay such as shown in FIG. 15, or that of FIG. 16 soon to be discussed. It will be apparent to one skilled in the art that for using a variable-frequency clock delay, for example that shown in FIG. 15 or that shown in FIG. 16, the digital to variable frequency clock converter of FIG. 14 can become part of the variable audio delay 36, the delay detector 34, or the variable video delay 28 shown in the system of FIG. 3. Several commercially available integrated circuits are available which perform the functions of FIG. 14. The division of the delay number can be performed by programmable read-only memory. The comparator 187 can be performed by 74LS685. The integration 191 can be performed by an integrated circuit op-amp, such as the generic 741 type. Several integrator circuits are available in applications literature from manufactures which produce this part. The voltage-controlled oscillator 195 can be built around a 74LS624. The counter 197 can be built around a 74LS491. The timer 201 can be built around a 74LS221. The details of construction of such a circuit utilizing these parts will be obvious to one skilled in the art.

FIG. 16 shows a variable-frequency clock audio delay circuit having an audio input terminal 206 corresponds to 37 of FIG. 4, an A-to-D converter 207 responsive to the input audio to provide digitized audio on output terminal 208, digital shift registers 210 responsive to the digital audio output from the A-to-D converter to provide delayed digital audio output on terminal 212. The delayed digital audio output is applied to the input of the D-to-A converter 213 which converts the digital audio back to analog audio and outputs the delayed audio on terminal 214 corresponding to 39 of FIG. 4.

A-to-D converter 207 has a clock input 209, shift registers 210 have a clock input terminal 211, and D-to-A converter 213 has a clock input terminal 215. All three of these devices are provided with the same variable-frequency clock which corresponds to 38 of FIG. 4 and which, for example, could be the variable-frequency clock output of terminal 196 of FIG. 14. It will be readily apparent to one skilled in the art that the delay of audio passing through this system is responsive to the number of shift register elements and the frequency of the clocking signal. If the clocking signal frequency is increased, the audio delay will be decreased. Conversely, if the clocking frequency is decreased, the audio delay will be increased. The overall operation of this circuit is much the same as that of the CCD device of FIG. 15.

Several commercially available parts are available which can perform the functions of FIG. 16. A-to-D and D-to-A converters are available from companies such as Analog Devices and Burr Brown, and the shift register devices are available from companies such as Texas Instruments and Monolithic Memories. These companies are well-known to those skilled in the art.

Figure 17:
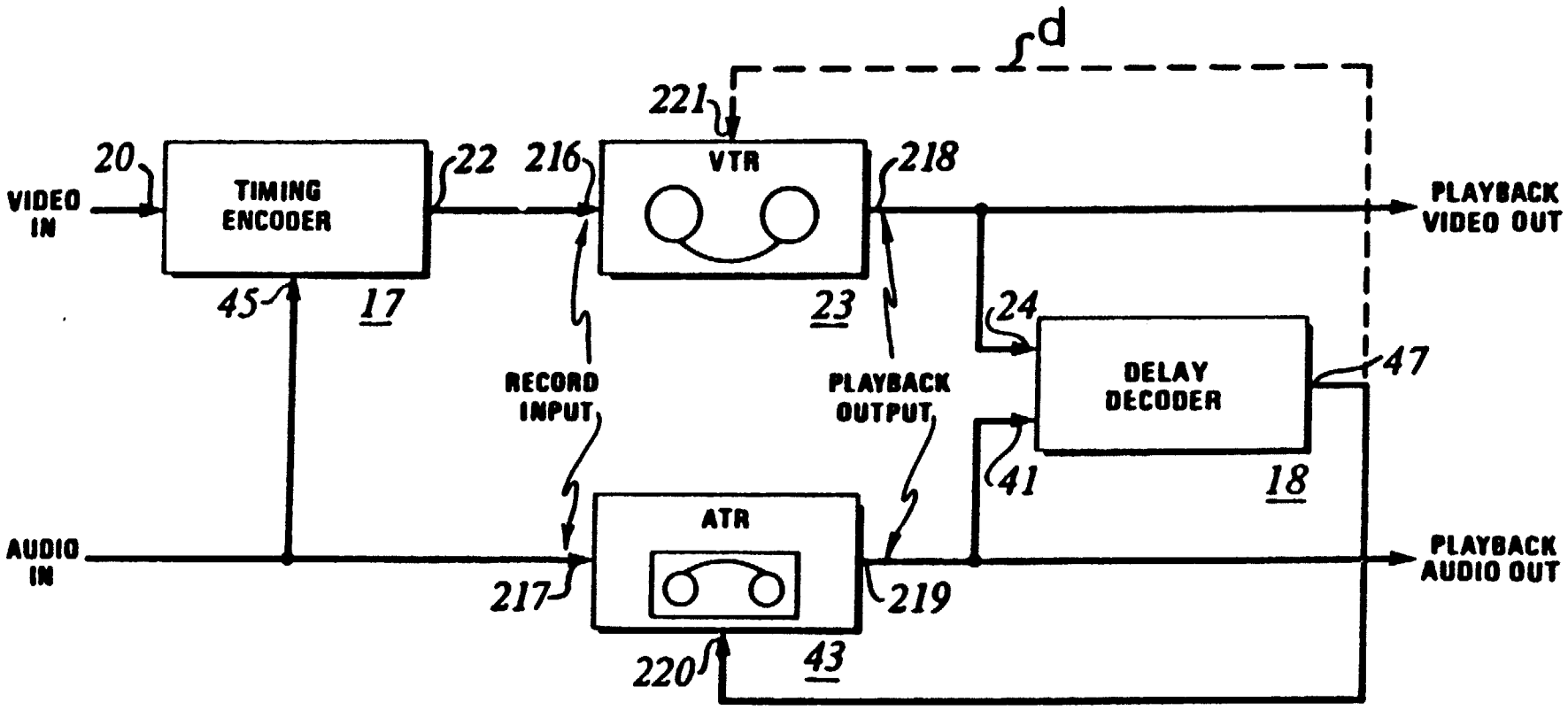
FIG. 17 is a block diagram of a fourth embodiment of the invention utilized with recording devices for the transmission medium.

FIG. 17 shows a fourth embodiment of the invention which may be utilized when the transmission paths 23 and 43 are recording devices such as a video tape recorder (VTR) for 23 and an audio tape recorder (ATR) for 43. FIG. 17 contains the timing encoder 17 having video input 20, audio input 45 and combined video and timing output 22; the same as FIG. 3. A video tape recorder having a record input 216, a video playback output 218 and a speed control input 221 is shown for transmission path 23. The video and timing signal could actually be recorded by the video recorder on separate tracks of the same recording medium, or the timing signal can be encoded in the video as previously shown. An audio tape recorder having an audio record input 217, an audio playback output 219 and a speed control input 220 is shown for transmission path 43. A delay decoder having inputs 24 and 41 and output 47; the same as FIG. 3 is also shown.

Since it is also possible to control the relative delay of the video and audio signals output from 218 and 219, respectively, by changing the playback speed of one or the other or both of the recording devices 23 and 43, the need for the delay generator 19 of FIG. 3 is eliminated. The delay output 47 is then simply coupled to the playback speed control input of one or both of the recording devices, causing the recording device to perform the delay function of 19.

In the preferred embodiment, since VTR's are typically more speed accurate than ATR's, the speed of the ATR may be changed by coupling delay output 47 to playback speed control input 220 only. As one skilled in the art will recognize, it is also possible to couple 47 to the VTR speed control unit 221 as shown by the dashed lined.

Interfacing the devices will be fairly simple since many recording devices will accept an external reference for playback speed control. The external reference typically is a signal which occurs at a periodic rate for example 60 Hz and increasing or decreasing this rate will cause a corresponding increase or decrease in playback speed. For recording devices which do not have built-in capability of accepting an external reference, the playback speed is often referenced to the A.C. power frequency by the use of a synchronous motor for moving the recording medium, i.e. tape or disc. By changing the frequency of the power supplied to the motor moving the medium, the playback speed is thereby affected.

The variable clock frequency delay outputs of FIGS. 13 and 14 are ideally suited for determining the frequency of the speed control reference or of the power applied to the aforementioned motor by simply dividing the oscillator output to give a frequency corresponding to the normally used reference frequency. For example, if the V.C.O. operates at 60 KHz and the reference frequency is 60 Hz the output is simply divided by 1000. Although only one audio and one video recorder is shown in FIG. 17, it is obvious that a multiplicity of devices can be utilized for recording and for playback. The system of FIG. 17 is recursive in nature since the delayed signals output from the delay generator are compared for proper timing. This embodiment of the invention will be extremely useful for synchronizing a laser compact disc audio player to a video tape recorder.

Referring back to the system block diagram given in FIG. 4, it can be seen that the timing signal generator 44 and the combiner circuit 21 may be effected by the binary audio encoder circuit shown in FIG. 7. The timing signal recovery circuit 26 may be effected by the binary audio decoder shown in FIG. 9. The timing signal generator 40 may be effected by the low-pass filter and comparator 98 and 100 of the binary audio encoder of FIG. 7. The delay detector circuit 34 may be effected by the delay counter circuit 125 and retriggerable one-shot 130 of FIG. 10, or by the correlation-based delay detector circuit of FIG. 11.

A further embodiment which may be utilized for the delay detector circuit 34 is the variable-frequency clocked audio delay circuit shown in FIG. 13. The variable audio delay circuit 36 will be performed by the circuit of FIG. 16, alternately by the circuit of FIG. 15, or by the circuit of FIG. 12, with the system of FIG. 4 being capable of operating with any combination of delay detector and variable audio delay with a suitable interface between the delay detectors and the variable-frequency clock type audio delays being shown in FIG. 14.

Variable video delay devices, commonly known as time-base correctors and frame synchronizers in the industry, are readily available. These devices may be genlocked to external references and the design of a suitable video delay device for element 28 of FIG. 4 is readily apparent to one skilled in the art, and therefore not discussed extensively in this specification.

The basic system shown in FIG. 3 consists of two parts, one part the timing encoder 17 located before the transmission paths and one part the delay decoder 18 and delay generator 19 after the transmission paths. The part before the transmission paths, 17, consists of a timing signal generator responsive to audio to generate a timing signal, which timing signal is combined with the video in order that it may be transmitted over the video transmission path with the video. In the circuitry shown by way of example, this timing signal corresponds to the zero-crossings of low-pass filtered audio. However, one skilled in the art will be able to utilize various different timing signals which are derived from the audio signal, since only a relatively small amount of timing information is required to be transmitted with the video signal.

The second part of the system of FIG. 3 is located at the receiving location at the end of the video transmission path. This section, composed or delay detector 18, essentially recovers the timing signal which was previously combined with the video, generates a new timing signal from the audio which has passed through a transmission path, and compares the two timing signals to determine their relative delay. This measure of the relative delay may be utilized to control a delay generator 19 containing a variable audio delay or a variable video delay, or both. The audio signal from the audio transmission path and the video signal from the video transmission path may therefore be synchronized in order to correct or restore any lip-sync problems which may have developed due to audio and video passing through unequal time delays.

The term 'transmission path' has been used throughout the specification to indicate a path, device or medium, over or through which the video passes which generates a delay in the video signal. 'Transmission path', is also used with respect to the audio signal to indicate that the audio signal passes over or through a transmission path, medium or device which causes a delay to the audio signal which may or may not be equivalent to the delay of the video passing through the video transmission path. "Transmission path" as used herein may refer to a recording or playback device and may include the delay generator function 19 in the recursive form of the invention. The actual nature of the transmission path is unimportant to the operation of the invention disclosed herein in that the invention measure only the relative delay between audio and video when the two signals are output from the respective transmission paths. While two separate transmission paths have generally been shown, it will be understood that audio and video may well be combined into one single transmission medium or in various different combinations of single, redundant and dual transmission paths may be incorporated in the audio system as is typically done in the industry.

It will be understood by one skilled in the art that various functions have been shown in preferred form and particularly, many functions have been shown in either analog or digital form as is most appropriate for the above explanations. One skilled in the art will immediately recognize that parts shown as analog can be converted to digital and vice versa.

Although this invention has been described in its preferred form with a certain degree of particularity, it is understood that the present disclosure of the preferred form has been made only by way of example, and that numerous changes in the details of construction and the combination and arrangement of parts may be resorted to, as well as combinations of functions or parts within or as part of other devices, or performed by microprocessor or other computing device without departing from the spirit and the scope of the invention as hereinafter claimed.

I claim:

1. A delay system for an audio signal and a video signal comprising:

a timing encoder which develops a combination signal that includes said video signal and timing information generated from said audio signal;

a delay decoder responsive to said combination signal and to said audio signal, said delay decoder being operative to develop a delay signal representing the relative delay time between said combination signal and said audio signal by comparing the timing information of said combination signal with said audio signal; and a delay generator responsive to said delay signal and operative to delay the least delayed of said combination signal and said audio signal by said relative delay time to resynchronize said combination signal with said audio signal.

2. A delay system as recited in claim 1 wherein said delay generator has a delay signal input, a combination signal input, an audio signal input, a delayed video output, and a delayed audio output, where the most delayed of said combination signal input and said audio signal input is substantially undelayed by said delay generator, and where the least delayed of said combination signal and said audio signal input is delayed by approximately said relative delay time.

3. A delay system as recited in claim 1 wherein said timing encoder includes a timing signal generator responsive to said audio signal and operative to develop a timing signal therefrom, and a combiner operative to combine said timing signal with said video signal to produce said combination signal.

4. A delay system as recited in claim 1 wherein said delay decoder includes a timing signal recoverer responsive to said combination signal and operative to develop a recovered timing signal, a comparison timing signal generator responsive to said audio signal and operative to produce a comparison timing signal, and a delay detector responsive to both said recovered timing signal and said comparison timing signal and operative to produce said delay signal.

5. A delay system as recited in claim 1 wherein said delay generator includes a variable video delay for delaying said combination signal in response to said delay signal, and a variable audio delay for delaying said audio signal in response to said delay signal.

6. A delay system as recited in claim 1 wherein said timing encoder includes a filter means for developing a bandwidth limited audio signal from said audio signal, and an audio-in-video encoder having as inputs said bandwidth limited audio signal and said video signal, said audio-in-video encoder developing said combination signal.

7. A delay system as recited in claim 6 wherein said delay decoder includes an audio-in-video decoder responsive to said combination signal and operative to develop a reconstructed video signal and a reconstructed bandwidth limited audio signal, and an audio delay detector responsive to said reconstructed bandwidth limited audio signal and said audio signal and operative to produce said delay signal.

8. A delay system for an audio signal and a video signal comprising:

a timing encoder which develops a combination signal that includes said video signal and timing information generated from said audio signal;

a delay decoder responsive to combination signal and to said audio signal, said delay decoder being operative to develop a delay signal representing the relative delay time between said combination signal and said audio signal by comparing the timing information of said combination signal with said audio signal; and a delay generator responsive to said delay signal and operative to delay said audio signal by said relative delay time to resynchronize said combination signal with said audio signal.

9. A delay system as recited in claim 8 wherein said audio signal includes a first audio signal and a second audio signal, said delay generator being operative to delay said first audio signal and said second audio signal by the same amount.

10. A delay system as recited in claim 9 wherein said timing encoder includes a filter means responsive to said first audio signal and operative to develop a bandwidth limited audio signal, and an audio-in-video encoder having as inputs said bandwidth limited audio signal and said video signal, said audio-in-video encoder developing said combination signal.

11. A delay system as recited in claim 10 wherein said delay decoder includes an audio-in-video decoder responsive to said combination signal and operative to develop a reconstructed video signal and a reconstructed bandwidth limited audio signal, and an audio delay detector responsive to said reconstructed bandwidth limited audio signal and said first audio signal and operative to produce said delay signal.

12. A delay system as recited in claim 9 wherein said delay generator includes a first variable audio delay for delaying said first audio signal in response to said delay signal, and a second variable audio delay for delaying said second audio signal in response to said delay signal.

13. A delay system as recited in claim 9 wherein said timing encoder includes a first filter means responsive to said first audio signal and operative to develop a first bandwidth limited audio signal, a second filter means responsive to said second audio signal and operative to develop a second bandwidth limited audio signal, and an audio-in-video encoder having as inputs said first bandwidth limited audio signal, said second bandwidth limited audio signal, and said video signal, said audio-in-video encoder developing said combination signal.

14. A delay system as recited in claim 13 wherein said delay decoder includes an audio-in-video decoder responsive to said combination signal and operative to develop a reconstructed video signal, a first reconstructed bandwidth limited audio signal, and a second reconstructed bandwidth limited audio signal, a first audio delay detector responsive to said first reconstructed bandwidth limited audio signal and said first audio signal and operative to produce a first delay signal, and a second audio delay detector responsive to said second reconstructed bandwidth limited audio signal and said second audio signal, and operative to produce a second delay signal.

15. A delay system as recited in claim 14 wherein said delay generator includes a first variable audio delay for delaying said first audio signal in response to said first delay signal, and a second variable audio delay for delaying said second audio signal in response to said second delay signal.

16. A delay system as recited in claim 4 wherein said delay detector includes timer means having a start input, a stop input, and a delay output; means responsive to said comparison timing signal and operative to develop a start signal at said start input if the signal level of said comparison timing signal is below a predetermined level for a predetermined period of time; and means responsive to said recovered timing signal of said combination signal and operative to develop a stop signal at said stop input if the signal level of said recovered timing signal is below a predetermined level for a predetermined period of time.

17. A delay system as recited in claim 4 wherein said delay detector includes means for storing a portion of said comparison timing signal; timer means activated simultaneously with the storage of said portion of said comparison timing signal, an output of said timer means being operative to develop said delay signal; and means responsive to said stored portion of said comparison timing signal and said recovered timing signal and operative to stop said timer means when the two match within a predetermined tolerance.

18. A delay system as recited in claim 4 wherein said delay detector includes a phase-lock loop which generates a variable frequency clock whose frequency is responsive to the delay between said comparison timing signal and said recovered timing signal.

19. A transmission system for an audio signal and a video signal comprising:

video transmission means having an originating node and a terminating node;

audio transmission means having an originating node and a terminating node, said audio signal being applied to said originating node of said audio transmission means;

a timing encoder responsive to said video signal and to said audio signal, said timing encoder being operative to develop a combination signal which is applied to said originating node of said video transmission means;

a delay decoder responsive to a transmitted combination signal developed at said terminating node of said video transmission means, and to a transmitted audio signal developed at said terminating node of said audio transmission means, said delay decoder being operative to develop a delay signal by comparing said transmitted audio signal;

a delay generator responsive to said delay signal, and to the earlier arriving of said transmitted combination signal and said transmitted audio signal, said delay generator being operative to delay said earlier arriving signal.

20. An audio and video transmission system as recited in claim 19 wherein said timing encoder includes a timing signal generator responsive to said audio signal and operative to develop an encoded timing signal, and combiner means having said encoded timing signal and said video signal as inputs and having said combination signal as an output.

21. An audio and video transmission system as recited in claim 19 wherein said timing encoder includes an analog to digital converter which develops a bianry audio signal from said audio signal, a timing signal generator which generates a timing signal from said video signal, register means for storing said binary audio signal until said timing signal is received from said timing signal generator, and combiner means responsive to said video signal and to the stored binary audio signal from said register means and operative to produce said combination signal.

22. An audio and video transmission system as recited in claim 21 wherein said analog to digital converter includes a filter means for filtering said audio signal and a comparator for converting the filtered audio signal from said filter means into said binary audio signal; wherein said timing signal generator includes a synchronization stripper and clock generator responsive to said video signal and operative to produce timing signals; and wherein said register means includes an enable gate for delaying said binary audio signal in response to said timing signals.

23. An audio and video transmission system as recited in claim 19 wherein said delay decoder includes a timing signal generator which develops a transmitted audio timing signal from said transmitted audio signal; timing signal recovery means which develops a recovered timing signal from said transmitted combination signal; and a delay detector responsive to said transmitted audio timing signal and said recovered timing signal and operative to develop said delay signal therefrom.

24. An audio and video transmission system as recited in claim 23 wherein said timing signal recovery means includes a reference generating means responsive to said transmitted combination signal and operative to develop a reference; a comparator responsive to both said transmitted combination signal and to said reference and operative to produce a comparison signal; a sync stripper and clock generator responsive to said transmitted combination signal and operative to develop a timing signal; and a latch responsive to said comparison signal and said timing signal and operative to develop said recovered timing signal.

25. An audio and video transmission system as recited in claim 23 wherein said delay detector includes delay means for delaying said recovered timing signal, digitizing means for digitizing said transmitted audio signal, and a delay counter responsive to said delayed recovered timing signal of said delay means and to said digitized transmitted audio signal of said digitizing means, and operative to develop said delay signal therefrom.

26. A method for transmitting and synchronizing audio and video signals comprising:

generating timing information from an audio input signal;

combining said timing information with a video input signal to create a combination signal;

transmitting said combination signal;

transmitting said audio input signal;

determining the relative delay between said transmitted combination signal and said transmitted audio input signal by comparing the timing information of said transmitted combination signal with said transmitted audio input signal; and delaying at least one of said transmitted combination signal and said transmitted audio signal by the amount of said relative delay.

27. A method for transmitting and synchronizing a collection of audio signals including a first audio signal with a video signal comprising:

generating timing information from the first audio signal of said collection of audio signal;

combining said information with a video input signal to create a combination signal;

transmitting said combination signal to create a transmitted combination signal;

transmitting said collection of audio signals to create a transmitted collection of audio signals including said first audio signal;

determining the relative delay between said transmitted combination signal and said transmitted first audio input signal by comparing the timing information of said transmitted combination signal with said transmitted first audio input signal; and delaying at least one of said transmitted combination signal and said transmitted collection of audio signals by the amount of said relative delay.

28. A method for transmitting and synchronizing a plurality of audio signals with a video signal comprising:

generating timing information from each of said plurality of audio signals;

combining said timing information with a video input signal to create a combination signal;

transmitting said combination signal to create a transmitted combination signal;

transmitting said plurality of audio signals to create a plurality of transmitted audio signals;

determining the relative delay between said transmitted combination signal and each of said plurality of transmitted audio signals by comparing the timing information of said transmitted combination signal with each of said plurality of transmitted audio signals; and delaying each of said plurality of transmitted audio signals by its relative delay.

29. A method for resynchronizing an audio signal and a video signal comprising:

encoding said video signal with timing information from said audio signal;

delaying said audio and said video signals;

decoding said timing information from said encoded video signal after said video signal has been delayed;

comparing said decoded timing information with said audio signal after said audio signal has been delayed to develop a delay factor; and delaying the least delayed of said delayed audio signal and said delayed video signal by the amount of said delay factor.

30. A delay system for an audio signal and a video signal comprising:

timing encoder means having as inputs said audio signal and said video signal, said timing encoder means combining said video signal and timing information derived from said audio signal to produce an output;

video recording means coupled to said output of said timing encoder means, said video recording means having a video playback output;

audio recording means having an audio input coupled to said audio signal, an audio speed control input, and an audio playback output;

delay decoder means responsive to said video playback output and to said audio playback output and operative to develop an audio speed control signal which is coupled to said audio speed control input to synchronize said audio playback output with said video playback output.

31. A delay system as recited in claim 30 wherein said video recording means further includes a video speed control input, and wherein said delay decoder means is further operative to develop a video speed control signal which is coupled to said video speed control input to synchronize said video playback output with said audio playback output.

32. A transmission system for an audio signal and a video signal comprising:

video transmission means having an originating node and a terminating node;

audio transmission means having an originating node and a terminating node, said audio signal being applied to said originating node of said audio transmission means;

a timing encoder responsive to said video signal and to said audio signal, said timing encoder being operative to develop a combination signal which is applied to said originating node of said video transmission means;

a delay decoder responsive to a transmitted combination signal developed at said terminating node of said video transmission means, and to a transmitted audio signal developed at said terminating node of said audio transmission means, said delay decoder being operative to develop a delay signal by comparing said transmitted combination signal and said transmitted audio signal; and wherein one of said audio or video transmission means has a delay, said delay having a variable length, and said variable length of said delay being responsive to said delay signal.

33. A delay equalizing system for an audio signal and an associated video signal comprising:

a timing encoder which develops a combination signal derived from said video signal and timing information generated from said audio signal;

a delay decoder responsive to said combination signal and to said audio signal, one of which signals may have been delayed relative to the other, said delay decoder being operative to control a delay generated in response to the relative delay time between said combination signal and said audio signal by comparing the timing information of said combination signal with said audio signal; and a delay generator responsive to said delay decoder and operative to delay the least delayed of said combination signal and said audio signal by said relative delay time to synchronize said combination signal and said audio signal.

34. A delay equalizing system for an audio signal and an associated video signal comprising:

a timing encoder which develops a combination signal derived from said video signal and timing information generated from said audio signal;

a delay decoder responsive to said combination signal and to said audio signal, one of which signals may have been delayed relative to the other, said delay decoder being operative to develop a delay signal representing the relative delay time, if any, between said combination signal and said audio signal by comparing the timing information of said combination signal with said audio signal; and said delay generator responsive to said delay signal and operative to delay the least delayed of said combination signal and said audio signal by said relative delay time to synchronize said combination signal and said audio signal.

*35. An apparatus for determining the relative delay bewteen an audio signal playback by an audio player means with an image recording playback by an image player means, which image recording includes a timing signal version of said audio signal which has been generated in response to said audio signal by a timing encoder means whic timing signal is also played back by said image player means, said apparatus including a delay decoder means responsive to said timing signal and said playback audio signal to generate a delay output responsive to the relative delay therebetween.*

*36. The apparatus of claim 35 wherein one of said image player means and said audio player means is responsive to said delay output such that the timing of the responsive players playback is controlled in response to said relative delay in order to minimize said relative delay.*

*37. The apparatus of claim 35 wherein the delay decoder means operates to correlate the audio signal and the timing signal.*

*38. The apparatus of claim 35 wherein the delay decoder means operates to generate a second timing signal from the audio signal, and to detect the relative delay between first and second timing signals.*

*39. The apparatus of claim 35 wherein the delay decoder means operates to generate a second timing signal from the audio signal, and to correlate the two timing signals to detect the relative delay therein.*

*40. The apparatus of claim 35 wherein the delay output is a variable frequency signal which is utilized as a playback speed reference by the audio player means.*

*41. A delay measurement system for an audio frequency signal and a video signal comprising: a timing encoder that produces a combination signal including said video signal and timing information derived from said audio frequency signal, and a delay decoder responsive to said audio frequency signal, and said combination signal one or both which have been delayed, to produce a delay signal representing the relative delay between said combination signal and said audio frequency signal by comparing said timing information from said combination signal with timing information derived from said audio frequency signal.*

*42. The delay measurement system as recited in claim 41 including a delay generator responsive to siad delay signal to resynchronize said combination signal and said audio frequency signal, said delay generator acting on the least delayed of said combination signal and said audio frequency signal to resynchronize same.*

*43. The delay measurement system as recited in claim 42 wherein said combination signal includes said video signal and timing information derived from said audio frequency signal and said delay generator acts on said audio frequency signal to resynchronize said audio frequency signal and said combination signal.*

*44. The delay measurement system as recited in claim 42 wherein said audio frequency signal and said combination signal are transmitted between an originating node and a terminating node respectively between said timing encoder and said delay generator.*

*45. The delay measurement system as recited in claim 42 wherein said audio frequency signal and said combination signal are recorded and played back respectively between said timing encoder and said delay generator.*

*46. The delay measurement system as recited in claim 42 wherein said delay decoder includes a means to vary the transmission of at least one of audio frequency signal or said video signal.*

*47. The delay measurement system as recited in claim 46 wherein there are at least two audio frequency signals.*

*48. A delay measurement method responsive to an audio signal and a combination of signals, comprising the steps of storing said combination of signals including an image signal and timing information derived from said audio signal on a common medium, and retrieving said audio signal and said timing information to measure the relative delay therebetween.*

* * * * *